United States Patent
Akyildiz et al.

(10) Patent No.: US 8,976,690 B2
(45) Date of Patent: Mar. 10, 2015

(54) FEMTO-RELAY SYSTEMS AND METHODS OF MANAGING SAME

(75) Inventors: Ian F. Akyildiz, Alpharetta, GA (US); David M. Gutierrez Estevez, Atlanta, GA (US); Elias Chavarria Reyes, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 371 days.

(21) Appl. No.: 13/246,463

(22) Filed: Sep. 27, 2011

(65) Prior Publication Data

US 2012/0076027 A1 Mar. 29, 2012

Related U.S. Application Data

(60) Provisional application No. 61/386,729, filed on Sep. 27, 2010, provisional application No. 61/386,755, filed on Sep. 27, 2010, provisional application No. 61/386,769, filed on Sep. 27, 2010, provisional application No. 61/386,787, filed on Sep. 27, 2010.

(51) Int. Cl.
*H04W 24/00* (2009.01)
*H04L 12/24* (2006.01)
(Continued)

(52) U.S. Cl.
CPC .......... *H04L 41/5025* (2013.01); *H04W 16/32* (2013.01); *H04W 84/045* (2013.01); *H04W 84/047* (2013.01)
USPC ........................................................ 370/252

(58) Field of Classification Search
CPC ............. H04L 41/5025; H04W 16/32; H04W 84/045; H04W 84/047
See application file for complete search history.

(56) References Cited

U.S. PATENT DOCUMENTS

| | | | |
|---|---|---|---|
| 8,180,999 B1 * | 5/2012 | Oakenfull | 712/28 |
| 2007/0211757 A1 * | 9/2007 | Oyman | 370/468 |

(Continued)

OTHER PUBLICATIONS

Rath et al., "FemtoHaul: Using Femtocells with Relays to Increase Macrocell Backhaul Bandwidth", Mar. 15-19, 2010, IFOCOM IEEE Conference on Computer Communications Workshops, 2010.*

(Continued)

*Primary Examiner* — Brian J Gillis
*Assistant Examiner* — Amy Ling
(74) *Attorney, Agent, or Firm* — Troutman Sanders LLP; Ryan A. Schneider; Dustin B. Weeks

(57) ABSTRACT

The various embodiments of the present invention relate generally to femto-relay systems and methods. An exemplary embodiment of the present invention provides a femto-relay system comprising a relay-radio, a femto-radio, a joint femto-relay resource management module, and an IP-backhaul QoS monitoring module. The relay-radio is in communication with a macro-cell base-station. The femto-radio is in communication with the relay-radio and configured to route signals between a core network and at least one femto-cell user equipment through an IP-backhaul link. The joint femto-relay resource management module is configured to intelligently manage radio resources between the femto-radio and the relay-radio to reduce cross-tier interference. The IP-backhaul QoS monitoring module is configured to monitor a QoS being delivered by the IP-backhaul link and notify the relay-radio to route signals between the femto-cell user equipment and core network through the macro-cell base-station if the QoS fall below a predetermined threshold.

17 Claims, 18 Drawing Sheets

(51) Int. Cl.
*H04W 16/32* (2009.01)
*H04W 84/04* (2009.01)

(56) References Cited

U.S. PATENT DOCUMENTS

| | | | |
|---|---|---|---|
| 2008/0085699 A1* | 4/2008 | Hirano et al. | 455/414.2 |
| 2010/0075698 A1* | 3/2010 | Rune et al. | 455/458 |
| 2010/0118827 A1* | 5/2010 | Sundaresan et al. | 370/330 |
| 2010/0118996 A1* | 5/2010 | Sundaresan et al. | 375/260 |
| 2010/0279687 A1* | 11/2010 | Horn et al. | 455/435.1 |
| 2011/0151877 A1* | 6/2011 | Tafreshi | 455/442 |
| 2011/0217985 A1* | 9/2011 | Gorokhov | 455/452.2 |
| 2012/0015659 A1* | 1/2012 | Kalyani et al. | 455/436 |
| 2012/0063373 A1* | 3/2012 | Chincholi et al. | 370/281 |
| 2012/0063415 A1* | 3/2012 | Yee | 370/331 |
| 2013/0039335 A1* | 2/2013 | Sundaresan et al. | 370/330 |
| 2013/0053048 A1* | 2/2013 | Garcia et al. | 455/450 |

OTHER PUBLICATIONS

Kulkarni, Gutam et al., SUbcarrier Allocation and Bit Loading Algorithms for OFDMA-Based Wireless Networks, IEEE, vol. 4, No. 6, Nov. 2005, pp. 652-662.*

Shankar, Siva, "Relay Node for LTE—Advanced", Jun. 27, 2010, p. 1-3.*

* cited by examiner

Figure 1  *Prior Art*

Algorithm 1 Suboptimal FRUM

1: $U \leftarrow F$
2: $A_m \leftarrow \emptyset \quad r_m \leftarrow 0 \quad \forall m$
3: $P_{av} \leftarrow P_{max}$
4: while $U \neq \emptyset$ do
5:   for all $m \in U$ do
6:     $l^* \leftarrow \arg\max\{\gamma_{m,l} | l \in L\}$
7:     $A_m \leftarrow A_m' + l^*$
8:     $r_m \leftarrow r_m + F(\gamma_{m,l^*})$
9:     $L \leftarrow L - l^*$
10:     if $r_m \geq R_m$ then
11:       $[\vec{\varepsilon}_m \; L_m] \leftarrow \text{MAWF}(A_m, \gamma_{m,A_m}, R_m)$
12:       $P_{fUE}(m) \leftarrow \vec{\varepsilon}_m$
13:       $L_{fUE}(m) \leftarrow L_m$
14:       $U \leftarrow U - m$
15:       $L \leftarrow L + (A_m - L_m)$
16:       $P \leftarrow P - \sum_l \varepsilon_l$
17:     end if
18:   end for
19: end while

Figure 9

Algorithm 2 Suboptimal MRSO

1: $U \leftarrow M$ $W \leftarrow \emptyset$ $I \leftarrow \emptyset$
2: $Pav \leftarrow Pmax$
3: $rm,l \leftarrow F(\gamma m,l)$ $\forall m \in U$ $\forall l \in L$
4: while $U \neq \emptyset$ do
5:   for all $m \in U$ do
6:     $A_m \leftarrow \arg\min_m \{|A|| \sum_{l \in A} F(\gamma_{m,l}) \geq R_m, A \in L$
7:     if $A_m = \emptyset$ then
8:       $A_m \leftarrow L$
9:       $U \leftarrow U - m$
10:       $W \leftarrow W + m$
11:     end if
12:   end for
13:   if $U \neq \emptyset \vee U = \emptyset$ then
14:     $m^* \leftarrow \arg\min_m \{|A_m| \;|m \in U\}$
15:     $[\bar{\varepsilon}, L^*] \leftarrow \mathrm{MAWF}(A_m, \gamma m, l, R_m)$
16:     if $\sum_l \varepsilon_l \leq Pav$ then
17:       $PmUE(m^*) \leftarrow \bar{\varepsilon}$
18:       $LmUE(m) \leftarrow L^*$
19:       $W \leftarrow W - m$   $L \leftarrow L - L^*$
20:     else
21:       $U \leftarrow U - m^*$
22:       $I \leftarrow m^*$
23:     end if
24:   else if $W \neq \emptyset$ then
25:     for all $m \in W$ do
26:       $[\bar{\varepsilon}, L^*] \leftarrow \mathrm{MAWF}(A_m)$
27:       if $\sum_l \varepsilon_l \leq Pav$ then
28:         $PmUE(m^*) \leftarrow \bar{\varepsilon}$
29:         $LmUE(m^*) \leftarrow L^*$
30:         $W \leftarrow W - m$   $L \leftarrow L - L^*$
31:         $Pav \leftarrow Pav - \sum_l \varepsilon_l$
32:       else
33:         $W \leftarrow W - m$
34:         $I \leftarrow I + m$
35:       end if
36:     end for
37:   end if
38: end while

Figure 10

FEMTO-RELAY SYSTEMS AND METHODS OF MANAGING SAME

CROSS-REFERENCE TO RELATED APPLICATIONS

This application claims the benefit of U.S. Provisional Application Ser. No. 61/386,729, filed 27 Sep. 2010, U.S. Provisional Application Ser. No. 61/386,755, filed 27 Sep. 2010, U.S. Provisional Application Ser. No. 61/386,769, filed 27 Sep. 2010, and U.S. Provisional Application Ser. No. 61/386,787, filed 27 Sep. 2010, all of which are incorporated herein by reference in their entirety as if fully set forth below.

TECHNICAL FIELD OF THE INVENTION

The various embodiments of the present application relate generally to transceiver communication systems and methods. More particularly, the various embodiments of the present invention are directed to cellular communication systems and methods employing femto-relay systems.

BACKGROUND OF THE INVENTION

Over the last decade, smartphones have revolutionized the cellular phone industry. Text, image, and voice data, among other applications employed by smartphones and other devices have greatly increased the amount of traffic moving through cellular networks. Unfortunately, there is only a limited spectrum that can be used by cellular providers to serve their customers. Thus, spectrum bands are so packed today that their ownership has become an extremely expensive luxury that very few operators can afford. To improve network capacity, providers employed better modulation and coding techniques as well as advanced spectrum slicing techniques, which have led to a 25-fold gain in network capacity. The largest gains, a stunning 1600-fold, however, have come from spectrum reuse, originated by a reduction in the cell sizes and transmit distances.

Wireless service providers take advantage of spectrum reuse by deploying an increased number of base-stations with different coverage area extensions. Depending on their extension, cells can be classified—from largest to smallest by coverage area—into macro-cells, micro-cells, pico-cells, and femto-cells, representatively shown in FIG. 1. The first three types of cells fall into the category of operator deployed infrastructure. Distributed antennas—spatially separated antennas distributed over the macro-cell and connected to a macro-cell base station via a dedicated backhaul link—and relays—infrastructure devices with a wireless backhaul to the base station that forward calls and data to mobile devices—are also part of this technology group. The installation of the infrastructure in any of these cases must be carefully planned in order to optimize the performance of the network. This requires previous knowledge from the wireless service provider regarding the locations in which the network performance is experiencing coverage or throughput problems. Acquiring this knowledge, either reactively (performing measurements in response to user complaints) or proactively (performing measurements before receiving user complaints) represents increased costs for wireless service providers. In general, deploying base-stations and relays are expensive options for the wireless service provider, as their deployment involves planning, site, equipment, installation, energy, and maintenance costs.

Femto-cells are a new, promising technology that follow a different approach from the three cell types described above. Given that recent studies show that a great amount of voice and data services are provided or originated indoors, e.g. homes and buildings, it has become even more important to provide high throughput and coverage in those environments. Femto-cells aim at improving coverage and data rates in small indoor environments for a small number of users. Therefore, Femto-cell Access Points ("FAPs") are acquired, owned, and installed by the final user. FAPs operate in the licensed spectrum, and the connection to the operator or service provider's core network is achieved via an IP-backhaul link, instead of through the provider's wireless access infrastructure. FIG. 2 shows the general scheme of a conventional femto-cell system.

From a user's perspective, femto-cells provide the benefits of 3G/4G data rates and high voice quality in indoor environments, with both increased battery life, and possibly lower call cost (as the wireless service providers may encourage femto-cell usage). From the wireless service provider's perspective, femto-cells also provide several benefits. Femto-cells represent a low-cost alternative to improve the coverage and throughput in indoor environments because the cost of the FAP can be transferred to the final user. By improving the user experience in indoor environments, wireless service providers are in a better position to compete with fixed providers of VoIP and WiFi. Another important benefit of femto-cells is that the traffic of the users that are served by the FAP is offloaded from the macro-cell through the wired IP-backhaul link, which reduces the traffic load within the operator's infrastructure and leaves more resources available to serve users that are not in a femto-cell layer.

While being advantageous over many prior systems, conventional femto-cells present many shortcomings, which severely limit their performance capabilities. Two of the major problems facing conventional femto-cells are (1) the interference caused by random femto-cell deployments, and (2) the incapability of guaranteeing acceptable Quality of Service ("QoS") through the IP-backhaul link.

Interference Caused by Conventional Femto-cells Deployments

The characteristics of femto-cell deployments (within the coverage area of a single macro-cell base-station) lead to interference scenarios that can severely degrade the throughput of the femto-cell layer and the macro-cell layer. Because FAPs are acquired by the final user for an indoor environment, the coverage area of the femto-cell does not need to be large. In addition, the number of femto-cells within the coverage area of a macro-cell base-station can be quite large because each residence or building within the macro-cell can potentially have one or more femto-cells. These characteristics lead to a variety of interference cases, which are briefly described below.

Femto-cell to Macro-cell Interference: There are two primary classes of equipment within the macro-cell: (1) femto-cell user equipments ("fUEs"), which are devices within the femto-cell coverage area served by the femto-cell, i.e. data is routed between the fUEs and the core network through the IP-backhaul link; and (2) macro-cell user equipments ("mUEs"), which are devices within the macro-cell served by the base-station, i.e. data is routed between the core stations and the mUE's via the base-station. In the down-link ("DL"), the transmission from the FAP to the fUEs causes interference at the mUEs. In general, this interference increases, first, as the distance from the mUEs to the FAP decreases and, second, as the distance from the fUEs to the FAP increases. The second factor appears because the transmission power of the FAP (and the interference that it causes) increases as its distance to the fUEs increases. In the up-link ("UL"), the transmission from the fUEs to the FAP causes interference at the base station. This interference increases, first, as the distance from the fUEs to the base station decreases and, second, as the distance from the fUEs to the FAP increases. This second factor appears because the transmission power of the fUEs (and the interference they cause) increases as their distance to the FAP increases.

Macro-cell to Femto-cell Interference: In the DL, the transmission from the macro-cell base-station to the mUEs causes interference at the fUEs. In general, this interference increases as the distance from the fUEs to the base-station decreases. In the UL, the transmission from the mUEs to the base-station causes interference at the FAP. This interference increases, first, as the distance from the mUEs to the FAP decreases and, second, as the distance from the mUEs to the base-station increases. The second factor appears because the transmission power of mUEs increases as their distance to the base-station increases.

Femto-cell to Femto-cell Interference: Femto-cells also can interfere with other femto-cells, especially when the two femto-cells are geographically located close to each other. For example, consider two FAPs close to each other (e.g., in the same residential building), FAP1 and FAP2, serving fUE1 and fUE2, respectively. In the DL, the transmission from FAP1 to fUE1 causes interference at fUE2. In the same way, the transmission from FAP2 to fUE2 causes interference at fUE1. This interference increases as the distance between fUE2 and fUE1 decreases. Also, the interference increases as the distance from FAP1 to fUE1 increases (in the first case), and the distance from FAP2 to fUE2 increases (in the second case). This type of interference can severely degrade the performance of femto-cells in high density femto-cell deployments, such as residential buildings.

In a macro-cell layer, an mUE can choose to connect to the base-station that provides the "strongest" signal. In a network of femto-cells, however, mUEs usually will not be allowed to connect to the femto-cell (because the FAP and internet connection are paid for by the users of fUEs). This restriction further increases the severity of interference-related problems with femto-cells.

QoS Impairments in Conventional Femto-cells

In addition to the interference problems discussed above, conventional femto-cells also present many problems to users relating to the QoS they are capable of providing. In a typical femto-cell deployment, a wired link connects the FAP to the core network of the wireless service provider. In most cases, this wired link will be an internet connection provided by an Internet Service Provider ("ISP"). The performance of the internet connection is sensitive to network congestion, which can lead to packet loss, delay, and jitter. Therefore, the femto-cell data also will experience similar problems.

Congestion can occur at different levels of the network. At the Local Area Network ("LAN") level (within the home or enterprise), congestion can occur due to multiple active devices sharing the network (e.g. laptops, desktops, game consoles, servers). At the ISP network level, congestion can occur due to a plurality of active clients sharing the ISP's network. At the "internet level," which includes all the network devices that are not under the control of the ISP, congestion can occur due to a plurality of active users sending/receiving traffic across the network.

Conventional femto-cells employ many different techniques in an attempt to reduce congestion and improve QoS. For example, within the LAN, the final user could prioritize the data sent/received by the femto-cell to reduce the impact of congestion. If the ISP is aware of the QoS requirements of fUEs' data, the ISP could also prioritize data to reduce the impact of ISP network congestion in the QoS. Unfortunately, even if the ISP is able to perform the prioritization, congestion still can occur at the "internet level." Thus, QoS problems persist. If, due to congestion problems, the QoS requirements of the fUEs' data are not satisfied, the final user perception will be that the femto-cell is not fulfilling its main purpose: high quality voice and data communications in indoor environments.

In addition to the above-mentioned shortcomings, providing synchronization and timing is another major problem with conventional femto-cells. Synchronization is needed to perform successful handovers, minimize multi-access interference, and ensure tolerable carrier offset. Obtaining accurate synchronization over the IP backhaul, however, can be very difficult. Further, the risk of call drops while a handover is performed (i.e., switched across from macro-cell to femto-cell or vice versa) is quite high.

Therefore, there is a desire for systems and methods that increase the capacity of a cellular network to serve a plurality of cellular devices while delivering high QoS data transfer with minimal interference. Various embodiments of the present invention provide such systems and methods.

BRIEF SUMMARY OF THE INVENTION

The present invention relates to femto-relay and multi-femto-relay systems and methods of managing femto-relay and multi-femto-relay systems. An exemplary embodiment of the present invention provides a femto-relay system comprising a relay-radio, a femto-radio, and an IP-backhaul QoS monitoring module. The relay-radio is in communication with a macro-cell base-station. The femto-radio is in communication with the relay-radio and is configured to route signals to and from at least one fUE via a first communication path comprising an IP-backhaul link. The IP-backhaul QoS monitoring module is configured to monitor a QoS being delivered by the IP-backhaul link and notify the relay-radio to route signals to and from the at least one fUE via a second communication path comprising the macro-cell base-station if the quality of service falls below a predetermined threshold.

In an exemplary embodiment of the present invention, the relay-radio is configured to route signals to and from at least one mUE via the macro-cell base-station. In another exemplary embodiment of the present invention, the femto-relay system further comprises a joint femto-relay resource management module configured to intelligently manage radio resources between the femto-radio and the relay-radio to reduce cross-tier interference relative to cross-tier interference that would exist without the joint femto-relay resource management module. In yet another exemplary embodiment of the present invention, the relay-radio is in communication with the macro-cell base-station via a communication path that is an indirect link comprising at least one repeater unit. In some embodiments of the present invention, the at least one repeater unit is another femto-relay system. In still yet another exemplary embodiment of the present invention, the femto-radio is further configured to route signals to and from at least one mUE via the relay-radio and the macro-cell base-station.

For a femto-relay system having a limited amount of resources to serve a plurality of mUEs and/or fUEs, various embodiments of the present invention provide methods of allocating the limited resources to the user equipments. In an exemplary embodiment of the present invention, a method comprises allocating a first amount of resources to each fUE being served by the femto-relay system, wherein the first amount of resources is the amount of resources necessary to satisfy a first predetermined QoS threshold for each fUE, and allocating the remaining amount of resources to one or more mUEs, wherein the remaining amount of resources satisfy a second predetermined QoS threshold for the one or more mUEs.

In an exemplary embodiment of the present invention the method further comprises determining whether a fUE previously being served by the femto-relay system is no longer being served by the femto-relay system, and reperforming the steps of allocating a first amount of resources and allocating the remaining resources, if an fUE previously being served by the femto-relay system is no longer being served by the femto-relay system. In yet another exemplary embodiment of the present invention, the method further comprises determining whether there are enough resources in the limited amount of resources to assign a sufficient amount of resources to each user equipment in the plurality of mUEs and/or fUEs such that the respective first and/or second predetermined QoS thresholds are satisfied.

For a femto-relay system having a limited amount of resources to serve a first number of mUEs and/or fUEs, wherein each user equipment needs an individual amount of resources to satisfy a QoS for the respective user equipment, various embodiments of the present invention provide a method of allocating the limited amount of resources to the user equipments. In an exemplary embodiment of the present invention, the method comprises: determining whether the limited amount of resources is greater than or equal to the individual amount of resources for each user equipment in the first number of mUEs and/or fUEs added together; and if the limited amount of resources is greater than or equal to the individual amount of resources of each user equipment in the first number of mUEs and/or fUEs added together, performing a first resource allocation sub-method comprising allocating the individual amount of resources needed by each user equipment in the first number of macro-cell and/or femto-cell user equipments to each respective user equipment. If, on the other hand, the limited amount of resources is less than the individual amount of resources for each user equipment in the first number of mUEs and/or fUEs added together, the method comprises performing a second resource allocation sub-method comprising: allocating the individual amount of resources needed by each fUE in the first number of mUEs and/or fUEs to each respective fUE; and using the remaining amount of resources not allocated to fUEs to allocate the individual amount of resources of one or more mUEs in the first amount of mUEs and/or fUEs to the respective one or more mUEs.

In another exemplary embodiment of the present invention, the method of allocating the limited amount of resources further comprises determining whether an mUE or fUE previously being served by the femto-relay system is no longer being served by the femto-relay system, and if an mUE or fUE previously being served by the femto-relay system is no longer being served by the femto-relay system, performing a third resource allocation sub-method. The third resource allocation sub-method comprises determining whether the limited amount of resources is greater than or equal to the individual amount of resources for each user equipment currently being served by the femto-relay system added together, and if the limited amount of resources is greater than or equal to the individual amount of resources for each user equipment currently being served by the femto-relay system added together, reperforming the first resource allocation sub-method. In an exemplary embodiment of the present invention, if the limited amount of resources is greater than or equal to the individual amount of resources for each user equipment currently being served by the femto-relay system added together, the method comprises reperforming the second resource allocation sub-method discussed above. In some embodiments of the present invention, if all mUEs and/or fUEs previously being served by the femto-relay system are still being served by the femto-relay system, the method comprises reperforming the second resource allocation sub-method discussed above.

The present invention also provides multi-femto-relay systems. In an exemplary embodiment of the present invention, a multi-femto-relay comprises a relay-radio, a plurality of femto-radios. The relay radio is in communication with a macro-cell base-station and comprises a joint multi-femto-relay resource management module. The joint multi-femto-relay resource management module is configured to intelligently manage resources between the relay-radio and the plurality of femto-radios to reduce cross-tier interference relative to cross-tier interference that would exist without the joint multi-femto-relay resource management module. Each femto-radio is in communication with the relay-radio and is configured to route signals to and from at least one fUE via a first communication path comprising an IP-backhaul link. At least one femto-radio in the plurality of femto-radios comprises an IP-backhaul QoS monitoring module configured to monitor the QoS being delivered by the IP-backhaul link and route signals to and from the at least one fUE via a second communication path comprising the macro-cell base-station, if the quality of service falls below a predetermined threshold. In some embodiments of the present invention, each femto-radio in the plurality of femto-radios comprises an IP-backhaul QoS monitoring module.

In an exemplary embodiment of the present invention, the relay-radio is configured to route signals to and from at least one mUE via the macro-cell base-station. In another exemplary embodiment of the present invention, at least one femto-radio further comprises a local femto resource management module configured to manage resources assigned to the femto-radio to reduce interference between the fUEs in communication with the femto-radio. In yet another exemplary embodiment of the present invention, the joint multi-femto-relay resource management module is configured to intelligently manage radio resources between the femto-radio and the relay-radio to reduce cross tier interference between all user-equipments being served by the multi-femto-relay system. In even still another exemplary embodiment of the present invention, at least one femto-radio in the plurality of femto-radios is further configured to route signals between a core network and an mUE through the relay-radio and the macro-cell base-station.

In an exemplary embodiment of the present invention, the relay-radio is in communication with the macro-cell base-station via a communication path that is one of a direct link or an indirect link, wherein the indirect link comprises at least one repeater unit. In another exemplary embodiment of the present invention, each femto-radio is in communication with the relay-radio via a communication path that is one of a direct link or an indirect link, wherein the indirect link comprises at least one repeater unit. In yet another exemplary embodiment of the present invention, the at least one repeater unit is a second femto-radio.

For a multi-femto relay system comprising a plurality of femto-radios and having a limited amount of resources to serve a plurality of fUEs at each femto-radio, the present invention provides methods of allocating the limited resources to the fUEs at each femto-radio. In an exemplary embodiment of the present invention, a method comprises identifying a first subset of the fUEs experiencing channel conditions at each available subcarrier above a predetermined threshold, assigning orthogonal subcarriers and a first amount of energy to each fUE in the first subset of fUEs, wherein the first amount of energy is the amount of energy necessary to satisfy a first predetermined QoS of each fUE in the first subset of fUEs, distributing the remaining energy to remaining subcarriers not assigned to the first subset of fUEs, increasing the energy assigned to the first subset fUEs to account for interference from assigning energy to the remaining subcarriers, and assigning the remaining subcarriers to a second subset of fUEs.

In another exemplary embodiment of the present invention, the method further comprises scheduling service to each fUE in the plurality of fUEs not included in the first subset or second subset of fUEs. In yet another exemplary embodiment of the present invention, the method further comprises determining whether any fUE previously being served by a femto-radio of the multi-femto-relay system is no longer being served by the femto-radio, and reperforming the steps of identifying a first subset of the fUEs, assigning orthogonal subcarriers, distributing remaining energy, increasing the energy, and assigning the remaining subcarriers, if any fUE previously being served by the femto-radio is no longer being served by the femto-radio. In still yet another exemplary embodiment of the present invention, the method further comprises determining whether there are enough subcarriers available to a femto-radio in the multi-femto-relay system to assign a subcarrier to each femto-cell user equipment being served by the femto-radio.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments of the present invention, but the subject matter is not limited to the specific elements and instrumentalities disclosed.

FIG. 9 provides pseudo-code for implementing a FRUM step, in accordance with an exemplary embodiment of the present invention.

FIG. 10 provides pseudo-code for implementing an MRSO step, in accordance with an exemplary embodiment of the present invention.

DETAILED DESCRIPTION OF THE INVENTION

To facilitate an understanding of the principles and features of the present invention, various illustrative embodiments are explained below. In particular, the invention is described in the context of being femto-relay systems and methods of managing the same. Embodiments of the present invention may be applied to cellular communication networks for improving network capacity, data transfer rates, and the quality of service delivered to users of the network. Embodiments of the present invention, however, are not limited to application with cellular networks. Instead, embodiments of the present invention may find application in many communication systems known in the art.

Some embodiments of the present invention are described in the context of providing wireless communication between devices, such as through Radio-Frequency ("RF") transmission. As described herein, RF is not limited to any particular frequency band and includes, but is not limited to, the High Frequency ("HF") band, the Very High Frequency ("VHF") band, the Ultra High Frequency ("UHF") band, Long wave ("L") band, Short wave ("S") band, the C band, the X band, the Kurz-Under ("$K_u$") band, the Kurz ("K") band, the Kurz-Above ("$K_a$") band, the V band, the W band, the mm band, and the like. Additionally, as those skilled in the art would understand and unless as otherwise stated, various embodiments of the present invention described as being in communication with each other, may be in wireless or wired communication. Further, unless otherwise stated, when two devices are in communication, they may be in either direct communication or indirect communication via a repeater unit. The repeater unit can be many repeater units known in the art, including, but not limited to, transceiver repeaters, signal amplifiers, network subsystems, similar communication devices, and the like.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

Femto-Relay Systems

Figure 1:
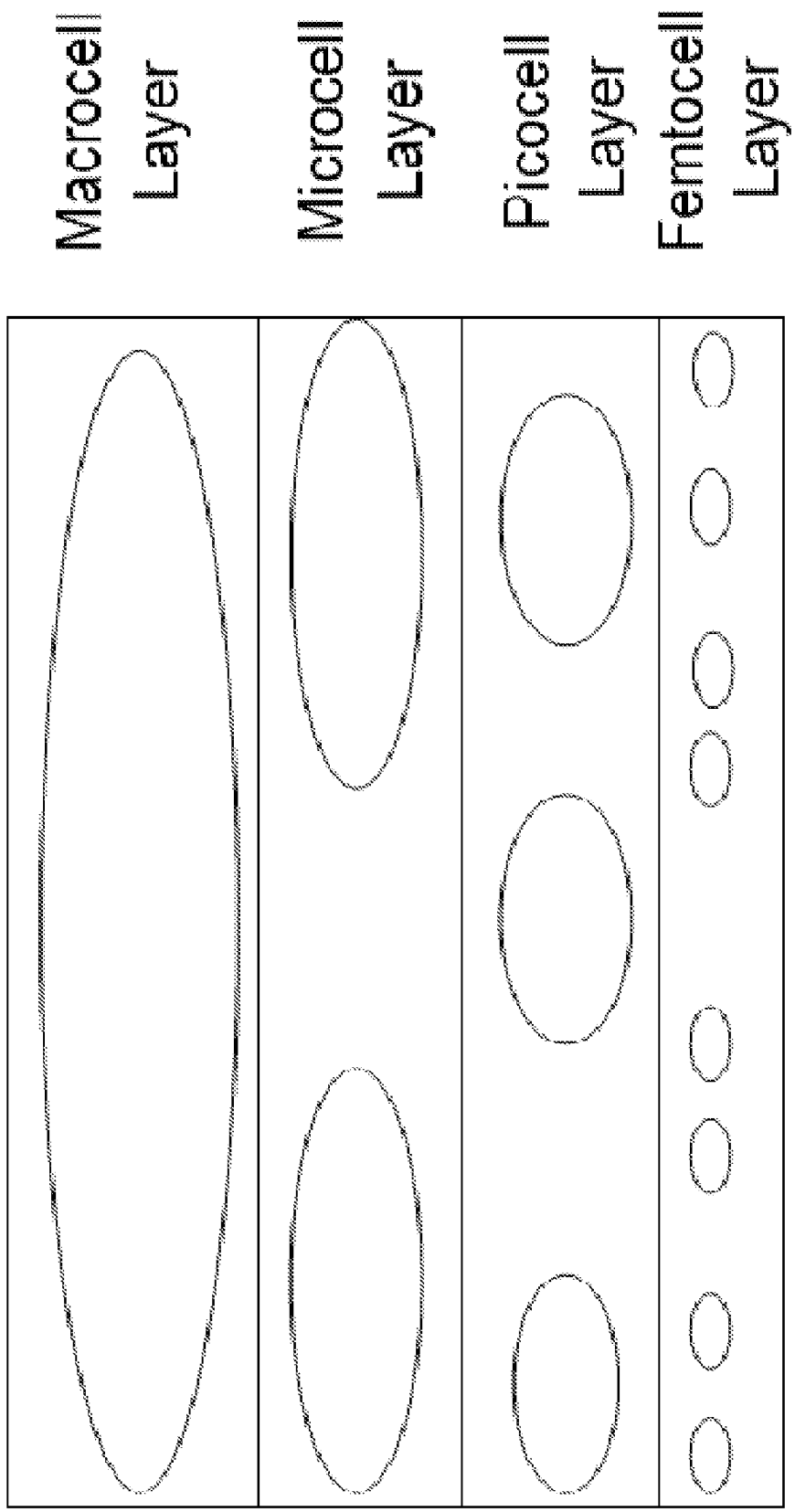
FIG. 1 illustrates conventional coverage areas for cells with varying extensions.
Figure 2:
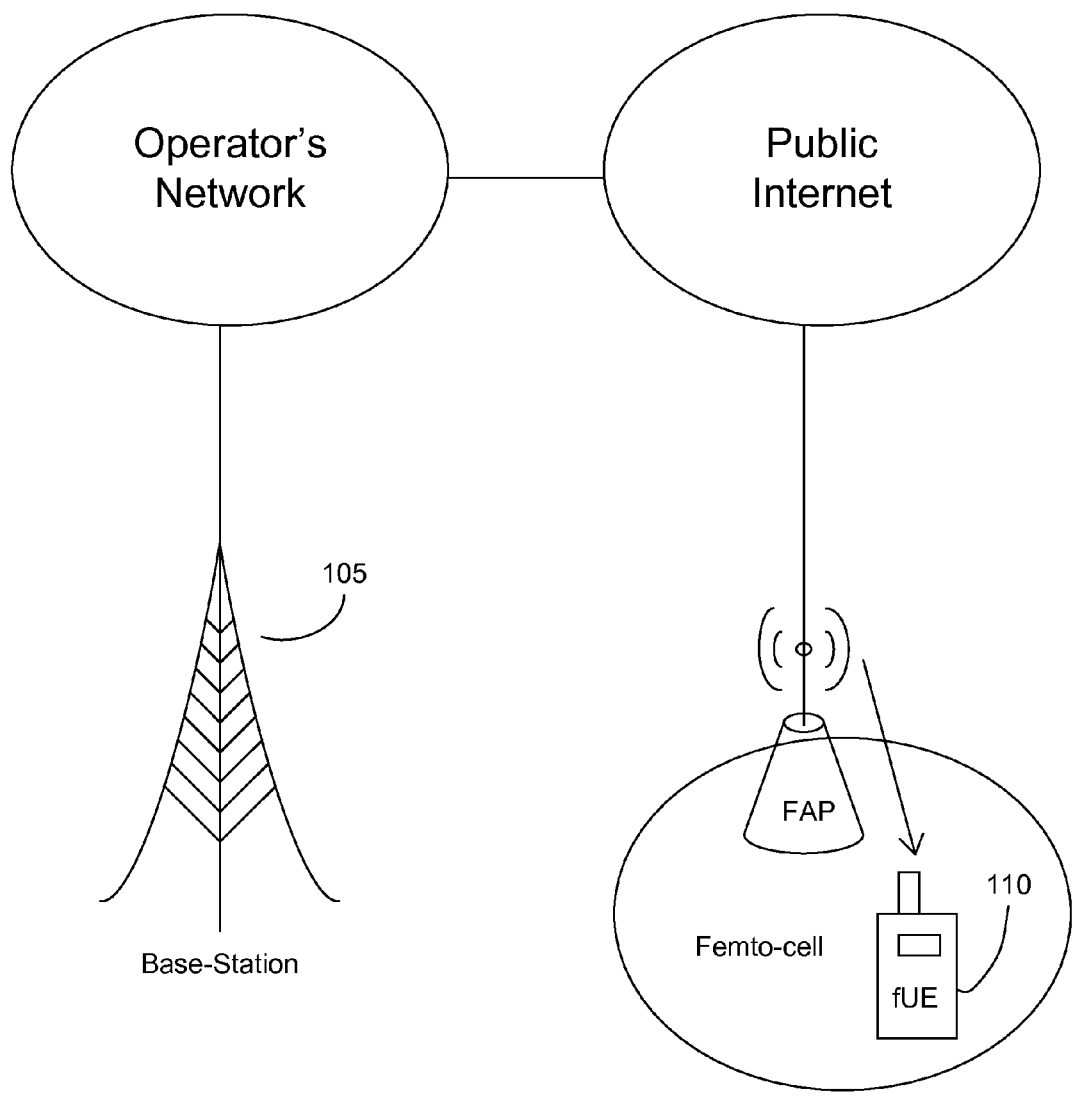
FIG. 2 illustrates a conventional femto-cell architecture.
Figure 3:
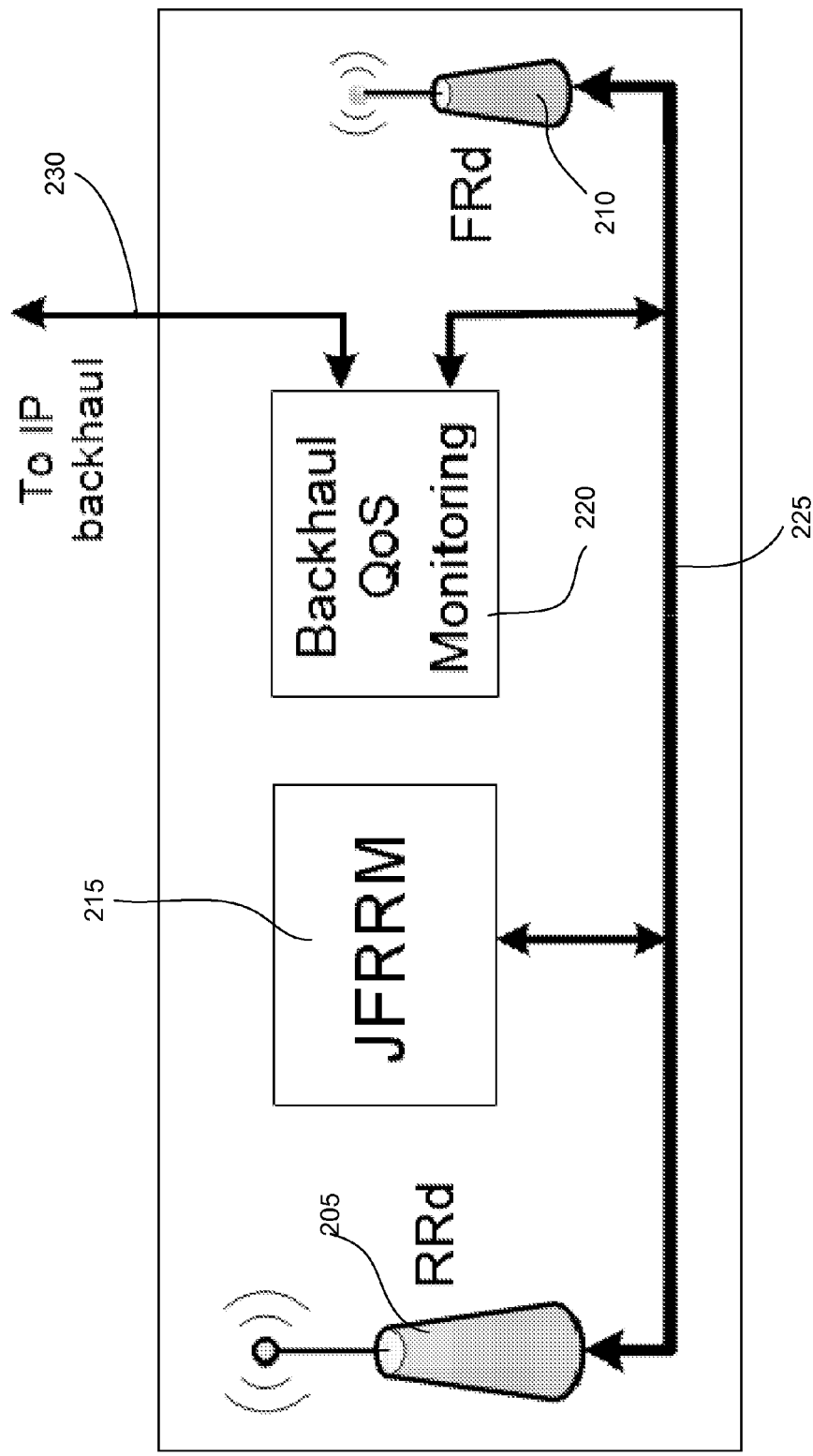
FIG. 3 provides a conceptual overview of a femto-relay system, in accordance with an exemplary embodiment of the present invention.

FIG. 3 provides a conceptual overview of a femto-relay system in accordance with an exemplary embodiment of the present invention. The exemplary femto-relay system comprises a relay-radio 205, a femto-radio 210, a joint femto-relay resource management module ("JFRRM") 215, and a IP-backhaul QoS monitoring module 220. The relay-radio 205, femto-radio 210, JFRRM 215, and IP-backhaul QoS monitoring module 220 can be in communication with each other via a shared bus 225. Another exemplary embodiment of the present invention provides a femto-relay system comprising a relay-radio 205, a femto-radio 210, and a IP-backhaul QoS monitoring module 220. The various femto-relay systems described herein can be seen as a system that bridges the macro-cell and femto-cell by introducing a degree of coordination.

Figure 4:
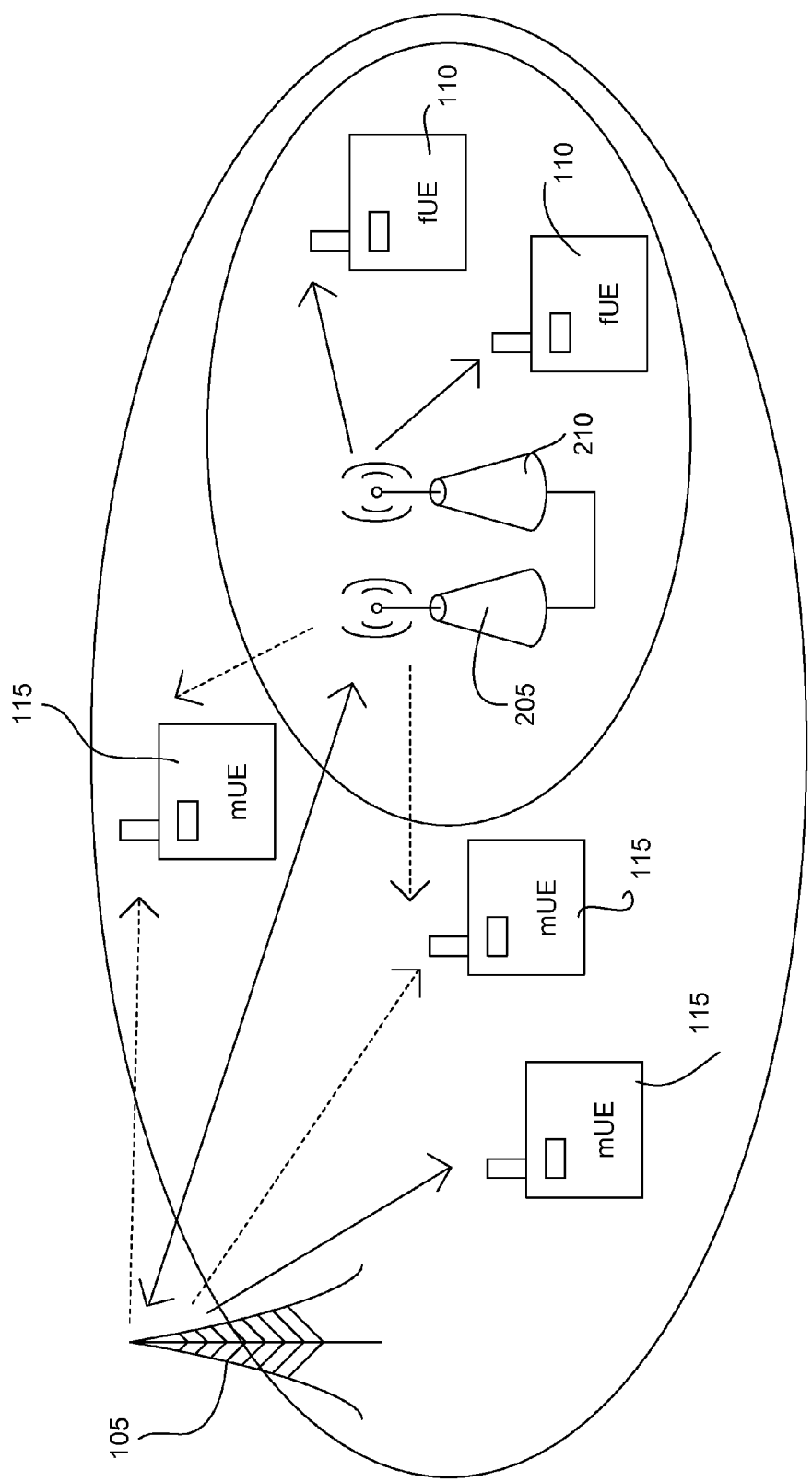
FIG. 4 illustrates operation of a femto-relay system in a macro-cell, in accordance with an exemplary embodiment of the present invention.

As shown in FIG. 4, a femto-cell can be created within the coverage area of a macro-cell. Signals from user equipments in the macro-cell can be routed to a core network via a macro-cell base-station 105. As used herein, the term "user equipment" refers to many devices accessing or attempting to access the core network, including, but not limited to, cellular phones, personal computers, tablet computers, and the like. The relay-radio 205 of the femto-relay system can be in communication with a base-station 105 of the macro-cell. In some embodiments of the present invention, the relay-radio 205 is in communication with the base-station 105 via a direct link to the base-station. In some embodiments of the present invention, the relay-radio 205 is in communication with the base-station 105 via an indirect link comprising, for example, a repeater unit. In an exemplary embodiment of the invention, a repeater unit is another femto-relay system.

The femto-radio can be in communication with fUEs 110 subscribing to the femto-cell. The femto-radio can be configured to route signals between the fUEs 110 and a destination point, such as a core cellular network, via a first communication path. As used herein if a device "routes" signals between a first point and a second point via a communication path, the device is configured to receive signals from the first point or second point and transmit the signals to the second point or first point, respectively, wherein the signal transmission path between either the device and the first point or the device and the second point comprises the communication path. Further, the communication path need not necessarily be a direct path, but can include one or more intermediate paths to get from one point to another point.

In an exemplary embodiment of the present invention, the femto-radio 210 is configured to route signals between the fUEs 110 and a core cellular network via a first communication path that comprises an IP-backhaul link 230. Thus, for example, the femto-radio 210 can receive a signal from an fUE 110 and transmit that signal through an IP-backhaul link 230 to the core network. Additionally, the femto-radio 210 can be configured to route signals between the fUEs 110 and a destination point via a second communication path. In an exemplary embodiment of the present invention, the femto-radio 210 can route signals between at least one fUE 110 and a core cellular network via a second communication path that comprises the relay radio 205 and the macro-cell base-station 105. For example, the femto-radio 210 can receive a signal from an fUE 110 and transmit that signal to the relay-radio 205, which transmits the signal to a macro-cell base-station 105, which transmits the signal to the core network.

In order to reduce congestion in the macro-cell, in an exemplary embodiment of the present invention, the femto-radio 210 is configured to route signals to and from an fUE 110 via a communication path comprising an IP-backhaul link 230. As discussed above, however, congestion and delay issues with the IP-backhaul link 230 can cause the QoS being delivered to the fUE 110 to fall below an acceptable threshold. Thus, an exemplary embodiment of the present invention comprises an IP-backhaul QoS monitoring module 220 configured to monitor the QoS being delivered by the IP-backhaul link 230 and, if the QoS falls below a predetermined threshold, to notify the relay-radio 205 to route signals to and from the fUE 110 via a second communication path that comprises the relay-radio 205 and the macro-cell base-station 105. Thus, in an exemplary embodiment of the present invention, communication between fUEs 110 and the core network is prioritized to first go through the IP-backhaul link 230, and second, if the QoS delivered by the IP-backhaul link 230 falls below a predetermined threshold, alternatively go through the base-station 105.

As used herein, QoS refers to the quality of the data stream, i.e. the level of satisfaction with which requirements of the service are being met. The predetermined QoS threshold can be based on many different parameters or combinations of parameters in various embodiments of the present invention, including, but not limited to, a desired data rate requirement of a particular application, a more general desired data rate, a specific acceptable error rate for a particular application, a more general acceptable error rate, and the like. In an exemplary embodiment of the present invention, the predetermined QoS threshold can also vary depending on the type of data being communicated; thus, the IP-backhaul link 230 can provide a first predetermined QoS threshold to a first fUE communicating audio data while providing a second QoS threshold for a second fUE communicating, for example, video data. In this embodiment, the IP-backhaul QoS monitoring module 220 monitors the QoS being delivered to both the first fUE and the second fUE, and if the QoS being delivered to either the first fUE or the second fUE falls below the first or second predetermine threshold, respectively, communications between the fUE failing to receive adequate QoS and the core network can be routed through the macro-cell base-station 105.

Each femto-relay system can have a limited number of resources to serve fUEs 110 and, in some embodiments, mUEs 115, including, but not limited to, subcarriers, transmission energy, spread codes, and the like. Thus, in some embodiments of the present invention, the femto-relay system comprises a JFRRM 215 configured to intelligently manage radio resources between the femto-radio 210 and the relay-radio 205 to reduce cross-tier interference. In an exemplary embodiment of the present invention, the JFRRM 215 ensures resources assigned to fUEs 110 and/or mUEs 115 are orthogonal, i.e. different subcarriers in OFDMA systems or orthogonal spreading codes in CDMA systems. In some embodiments of the present invention, the JFRRM 215 uses channel information from fUEs 110 and/or mUEs 115 obtained by the femto-radio 210 and/or the relay-radio 205. Taking into account this information as well as other possible constraints that will be satisfied, e.g. fUEs priority, users' data rate requirements, etc., the JFRRM 215 can intelligently allocate resources to user equipments being served by the femto-relay system.

Figure 5:
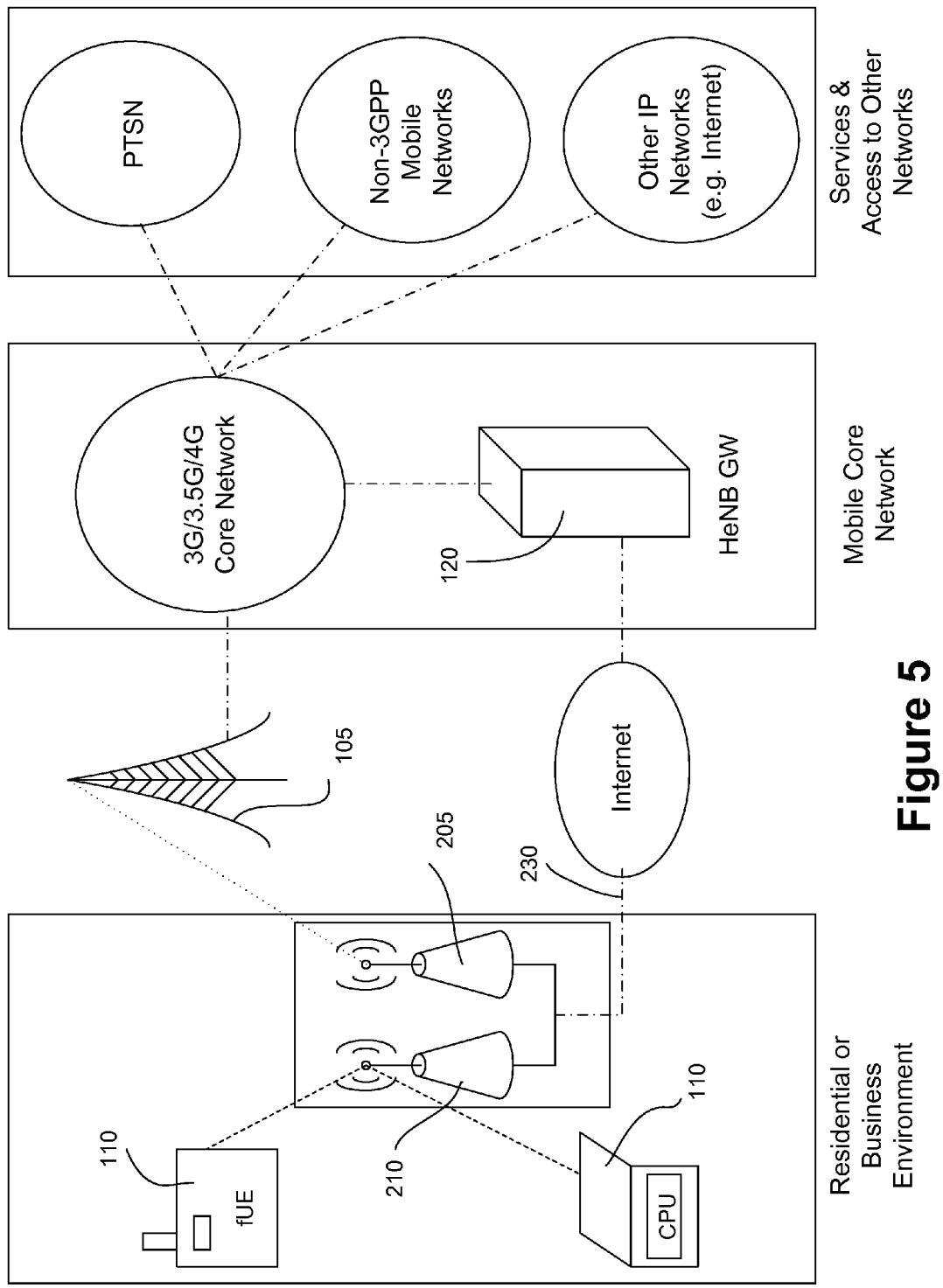
FIG. 5 illustrates the integration of a femto-relay system in a cellular network, in accordance with an exemplary embodiment of the present invention.

In accordance with an exemplary embodiment of the present invention, FIG. 5 illustrates the integration of a femto-relay system into a wireless cellular network where the 3GPP network architecture is taken as a reference. The Home eNodeB Gateway ("HeNB GW") 120 is the entity in charge of concentrating a large number of uncoordinated HeNBs, which is the 3GPP's name for FAPs. As depicted, the femto-relay system comprises a femto-radio 210, relay-radio 205, and an IP-backhaul link 230. The IP-backhaul link 230 provides access to the operator's core network without interfering with or congesting the operator's radio infrastructure. Thus, operators can greatly benefit by offloading communication traffic through the IP-backhaul link 230.

Figure 6:
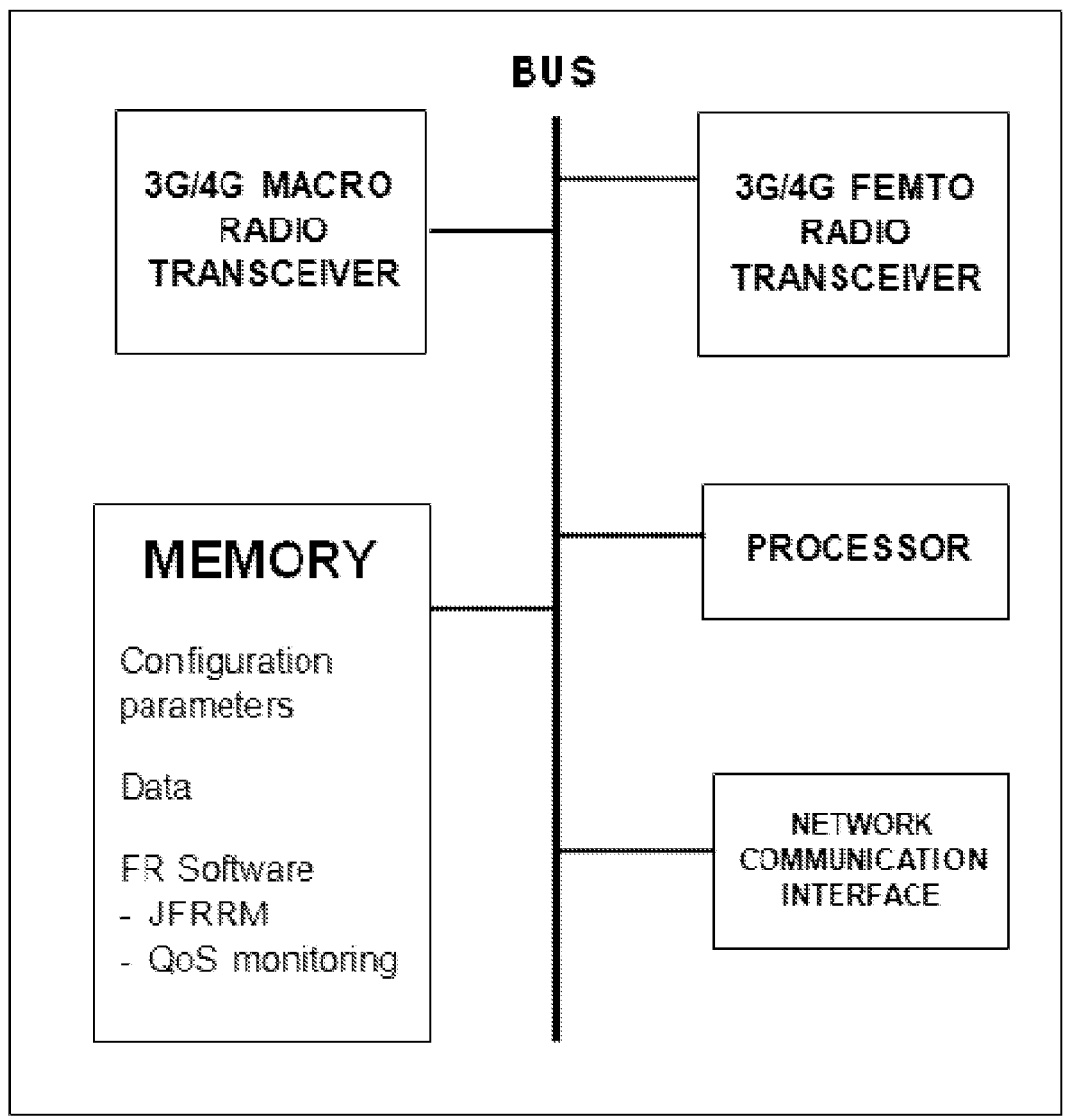
FIG. 6 provides a block diagram hardware components for a femto-relay system, in accordance with an exemplary embodiment of the present invention.

FIG. 6 provides a block diagram of hardware components of an exemplary femto-relay system. A femto-radio 210, relay-radio 205, processor, a network communications interface, and memory are each in communication with a shared bus. The memory can store instructions implemented by the processor. In an exemplary embodiment of the present invention, the IP-backhaul QoS monitoring module 220 and the JFRRM 215 each comprise instructions stored in memory, which can be implemented by a processor to carry out the various functions/steps described herein. In some embodiments of the present invention, the modules each have a distinct memory and processor. In some embodiments of the present invention, the modules share a common memory and/or processor. The network communications interface can maintain the connection of the fUEs with the operator's core network via the IP-backhaul link 230. Many technologies can be used to connect the femto-relay system to the internet via the IP-backhaul link 230, including, but not limited to, Ethernet, Token Ring, ATM LAN, and the like. The memory may be many storage devices known in the art, including, but not limited to, hard disks, flash memories, flash disks, and the like. In addition to the modules' instructions discussed above, the contents of the memory can comprise configuration parameters and other general data. The configuration parameters may include information used for the femto-relay system to operate in wireless networks, including, but not limited to, duplexing mode, uplink and downlink frequencies, network and site IDs, number of supported users, and the like. The memory can also store any intermediate and final results during the femto-relay system's operation in a location, such as the section addressed "Data" in FIG. 6.

In various embodiments of the present invention, the femto-radio 210 and relay-radio 205 can operate in many systems belonging to the 3G and 4G family of standards, i.e. UMTS, HSPA, HSPA+, LTE, LTE-A, and the like. Further, as those skilled in the art understand, the scope of the present invention is not limited to 3G and 4G standards, but instead, embodiments of the present invention can be used with systems belonging to other generations of wireless standards, including generations of wireless standards developed in the future.

In addition to femto-relay systems, the present invention provides methods of servicing user equipments using a femto-relay system. An exemplary method comprises routing signals to and from at least one user equipment via a first communication path, monitoring the QoS being delivered to the at least one user equipment, and rerouting the signals to and from the at least one user equipment via a second communication path if the QoS being delivered to the at least one user equipment falls below a predetermined threshold. In an exemplary embodiment of the present invention, the first communication path comprises an IP-backhaul link 230. In another exemplary embodiment of the present invention, the second communication path comprises a macro-cell base-station 105. In yet another exemplary embodiment of the present invention, the method further comprises intelligently allocating resources to the at least one user equipment to reduce cross tier interference.

Femto-Relay Resource Management and Interference Reduction

Figure 7:
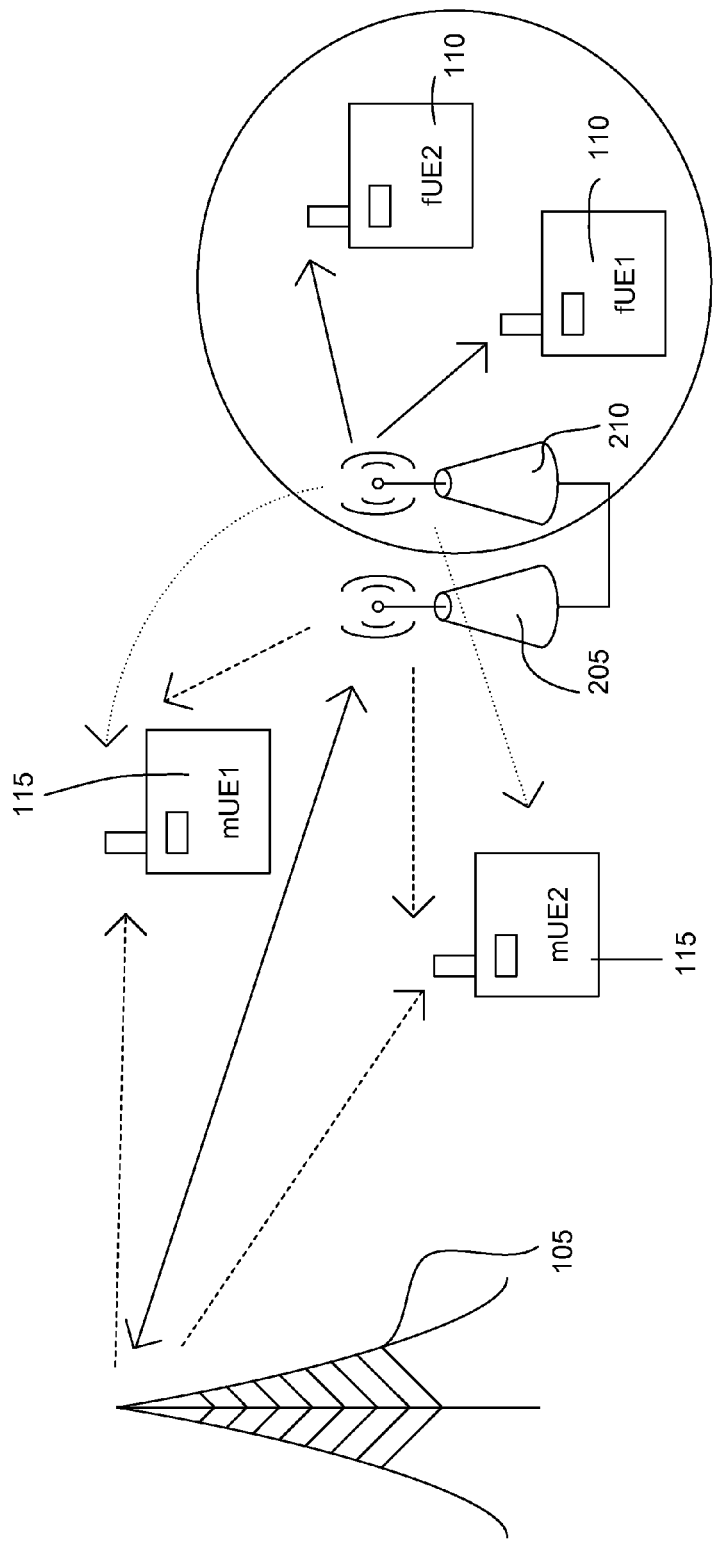
FIG. 7 illustrates a interference scenario in a macro-cell comprising a femto-relay system, in accordance with an exemplary embodiment of the present invention.

As discussed above, a major concern and limiting factor in a femto-cell's performance is interference, which can be classified as cross-tier if it occurs among macro-cell and femto-cell elements, or co-tier if the interference occurs among different femto-cell elements. A typical interference scenario is depicted in FIG. 7, which includes a base-station, a femto-relay system, a plurality of fUEs 110, and a plurality of mUEs 115. It can be assumed that the fUEs 110 are located within a relatively short distance of the femto-relay system so that the potential interference power they would receive from the base-station 105 is relatively negligible, which holds true as long as the femto-relay system is not too close to the base-station 105. As shown in FIG. 7, the solid lines indicate communication for which it can be assumed there are enough resources. This includes the base-station-to-femto-relay system link and femto-relay system-to-fUE links. Typically, the operational bandwidth and the maximum allowable transmit power of the femto-relay system is enough to provide service to a plurality of fUEs 110 up to what the operator specifies independently of their rate requirements. The dashed-dotted lines in FIG. 7 represent the potential interference the femto-relay system can cause the mUEs 115 in case the mUEs 115 were not captured and served by the femto-relay system. The dashed lines indicate potential relay-radio service to mUEs 115.

To better understand how embodiments of the present invention provide systems and methods for allocating resources in a femto-relay system to reduce interference, an understanding of how communication channels are modeled is helpful. Thus, a brief explanation of the channel model for an OFDMA system is provided. An OFDMA modeled system can provide a bandwidth on each subcarrier sufficiently small to overcome frequency-selective fading and inter-symbol interference. Therefore, all the subcarriers of the system can be modeled as flat Rayleigh fading channels correlated in time and frequency.

In an exemplary embodiment of the present invention, resource allocation can be performed at a femto-relay system based on channel information fed back by the users of the system. The Signal-to-Noise-Ratio ("SNR") $\gamma_{m,n}$ of a user m on subcarrier n can be computed according to Equation 1.

$$\gamma_{m,n} = \frac{C_{m,n}}{\sigma^2} \qquad \text{Equation 1}$$

In Equation 1, $C_{m,n}$ is the subcarrier signal strength and $\sigma^2$ is the noise power. The subcarrier strength $C_{m,n}$ can be computed using Equation 2.

$$C_{m,n} = P_n \cdot G_i \cdot L_i \cdot PL_m \cdot G_m \cdot L_m \cdot |Hn|^2 \qquad \text{Equation 2}$$

In Equation 2, i is the index of the transmitting femto-relay system in the $n^{th}$ subcarrier. $PL_m$ represents the path loss attenuation of user m, $|H_n|^2$ represents the fading of the frequency selective channel, G represents antenna gains, and L represents equipment losses. The propagation path-loss can have different forms for indoor (femto-relay to fUEs) and indoor-to-outdoor links (femto-relay to mUEs), which can be represented by Equations 3 and 4, respectively.

$$L = 30 + 37\log_{10} d + S + L_i \text{(dB)} \qquad \text{Equation 3}$$

$$L = 49 + 40\log_{10}\left(\frac{d}{1000}\right) + 30\log_{10} f + S + L_i + L_e \text{(dB)} \qquad \text{Equation 4}$$

In Equations 3 and 4, d and f are the amount of transmitter-receiver separation in meters and the frequency in MHz, respectively. S is the log-normal shadow fading random variable with a standard deviation of 12 dB. $L_e$ and $L_i$ account for the internal and external wall losses, respectively. $L_e$ can be a Gaussian distribution with a mean of about 7 dB and a standard deviation of about 6 dB while $L_i$ can be given by $L_i=4I$, where I is a Bernoulli random variable with success parameter of p=0.5.

The achievable data rate $R_{m,n}$ of user m in subcarrier n can be represented by Equation 5.

$$R_{m,n} = \Delta f \cdot \log_2\left(1 + \frac{\gamma_{m,n}}{\Gamma}\right) \qquad \text{Equation 5}$$

In Equation 5, $\Delta f$ is the subcarrier bandwidth and $\Gamma$ is represented as shown in Equation 6.

$$\Gamma = -\frac{\ln(5 \cdot BER)}{1.5} \qquad \text{Equation 6}$$

A basic explanation of the Mutual Information Effective Signal-to-Interference-plus-Noise-Ratio ("SINR") Mapping ("MIESM") technique is provided. In some practical systems, it may not be feasible to assign a different Modulation and Coding Scheme ("MCS") to each of the time-frequency resource elements, because doing so would require an enormous amount of feedback from user equipments. In some real systems like LTE, the smallest time-frequency unit that can be assigned to a certain user is called a Resource Block ("RB"), and can be defined as a group of twelve adjacent subcarriers and seven OFDM symbols. However, even though SINR values within an RB can be similar, they may not be identical. Therefore, in some embodiments of the present invention, an effective SINR value can be computed for an RB to use as input of the link adaptation mapping function.

MIESM is a model adopted in the WINNER project with the aim of reducing the processing overhead and complexity of system level simulations. Its goal is to find a mapping function for a vector of SINRs to a single effective value $SINR_{eff}$ yielding the same block-error-rate ("BLER"). For the mapping method, an information measure function can be defined. OFDM systems can be considered to be multi-state channel ("MSC") because different bits are transmitted on different subcarriers and OFDM symbols. From conventional knowledge regarding ergodic capacity and mutual information of MSCs, it can be inferred that an effective SINR value of an equivalent flat fading channel can be obtained from Equation 7.

$$SNR_{eff} = I^{-1}\left(\frac{1}{P}\sum_{p=1}^{N} I_p(SNR_p)\right) \qquad \text{Equation 7}$$

In Equation 7, $I_p(SNR_p)$ is the instantaneous mutual information on the $p^{th}$ subcarrier and P is the total number of subcarriers. For the Single-Input Single Output ("SISO") case, this measure can be defined by Equation 8.

$$I_p = \log_2\left(1 + \left(P_{total}/P \Big/ \sigma^2\right) \cdot |H_p|^2\right) \qquad \text{Equation 8}$$

In Equation 8, $P_{total}/P$ is the average power of each subcarrier, $\sigma$ represents the noise power, and $|H_p|^2$ is the channel power on subcarrier p. $I_p$ can then be seen as the rate of the fading subcarrier block. By assuming a quasi-stationary channel, this theory can be applied to the link adaptation problem by setting P to the number of subcarriers in each RB and calculating one effective SINR value valid for the whole block.

To address the interference and resource allocation issues relating to femto-relay systems, embodiments of the present invention provide systems and methods for reducing the interference caused by the femto-radio to neighboring mUEs 115 connected to an external base-station that are receiving a strong femto-radio signal. In some embodiments of the present invention, the femto-relay system comprises a JFRRM 215 configured to intelligently allocate radio resources of the femto-relay to reduce cross tier interference. In some embodiments the present invention, the JFRRM 215 operates on a two tier prioritization scheme: first, fUEs 110 are given highest priority, such that their QoS requirements are satisfied; and second, mUEs 115 are served with remaining resources.

Thus, in an exemplary embodiment of the present invention, the approach taken by the JFRRM 215 to allocate resources lies in two sub-approaches. The first sub-approach can be referred to as Femto Resource Utilization Minimization ("FRUM"). Generally speaking, this approach seeks the allocation of resources for the prioritized fUEs 110 so that the amount of utilized resources is minimized. In an exemplary embodiment of the present invention, resources can include, but are not limited to, subcarriers, power, OFDM symbols, and the like. The allocation can allow the fulfillment of the requirements for all fUEs 110 while reserving remaining resources for mUEs 115. The second sub-approach can be referred to as Macro Requirements Satisfaction Optimization ("MRSO"). Generally speaking, this approach allocates any remaining resources to the mUEs 115 in such a way that the interference is minimized, or at least reduced relative to the interference present absent such an approach. In some embodiments of the present invention, the MRSO approach seeks to maximize the number of mUEs 115 whose requirements can be fulfilled with the limited remaining resources.

Taking into account the FRUM and MRSO sub-approaches to resource allocation, an exemplary embodiment of the present invention provides a method of allocating a limited amount of resources to user equipments subscribing to a femto-relay system comprising allocating a first amount of the resources to each fUE 110 being served by the femto-relay system, and allocating the remaining resources that are not allocated to fUEs 110 to at least one mUE 115. In an exemplary embodiment of the present invention, the first amount of resources to each fUE 110 is the amount of resources necessary to satisfy a first predetermined QoS threshold for each fUE 110. In another exemplary embodiment of the present invention, a second predetermined QoS threshold is satisfied for each of the mUEs. In some embodiments of the present invention, the value of the first or second predetermined QoS threshold is different for each user equipment being served. In some embodiments of the present invention, the first predetermined threshold and the second predetermined threshold can have the same value. In some embodiments of the present invention, the first predetermined threshold and the second predetermined threshold have different values. As discussed above, the first and second predetermined thresholds can be based on many parameters, either individually or in combination.

In some embodiments of the present invention, there may be times when the femto-relay system has enough resources (e.g. subcarriers) available to assign one set of orthogonal subcarriers to each user equipment attempting to access the femto-relay system. In these cases, the femto-relay system may be able to assign a set of orthogonal subcarriers to each user equipment without using the computational effort that may be required in the interference management techniques involved in FRUM and MRSO. Thus, in some embodiments of the present invention, the method of allocating resources comprises determining whether the femto-relay system has enough subcarriers available to assign a distinct set of orthogonal subcarriers to each user equipment subscribing to the femto-relay system. If so, the femto-relay system can allocate an individual set of orthogonal subcarriers to each user-equipment, and thus, the interference management techniques may not need to be triggered. If there are not enough subcarriers available for each user equipment, then the step of allocating resources to the fUEs 110 and the step of allocating remaining resources to the mUEs 115 can be performed.

In another exemplary embodiment of the present invention, the method of allocating resources comprises determining whether any fUE 110 previously being served by the femto-relay system is no longer being served by the femto-relay system, and reperforming the steps of allocating a minimal amount of resources and allocating remaining resources, if any fUE 110 previously begin served by the femto-relay system is no longer being served by the femto-relay system. Thus, in some embodiments of the present invention the method is iterative, such that the femto-relay system can continually monitor the subscribers to the femto-relay system and reallocate resources according to the user equipments currently subscribed and their QoS needs.

Figure 8:
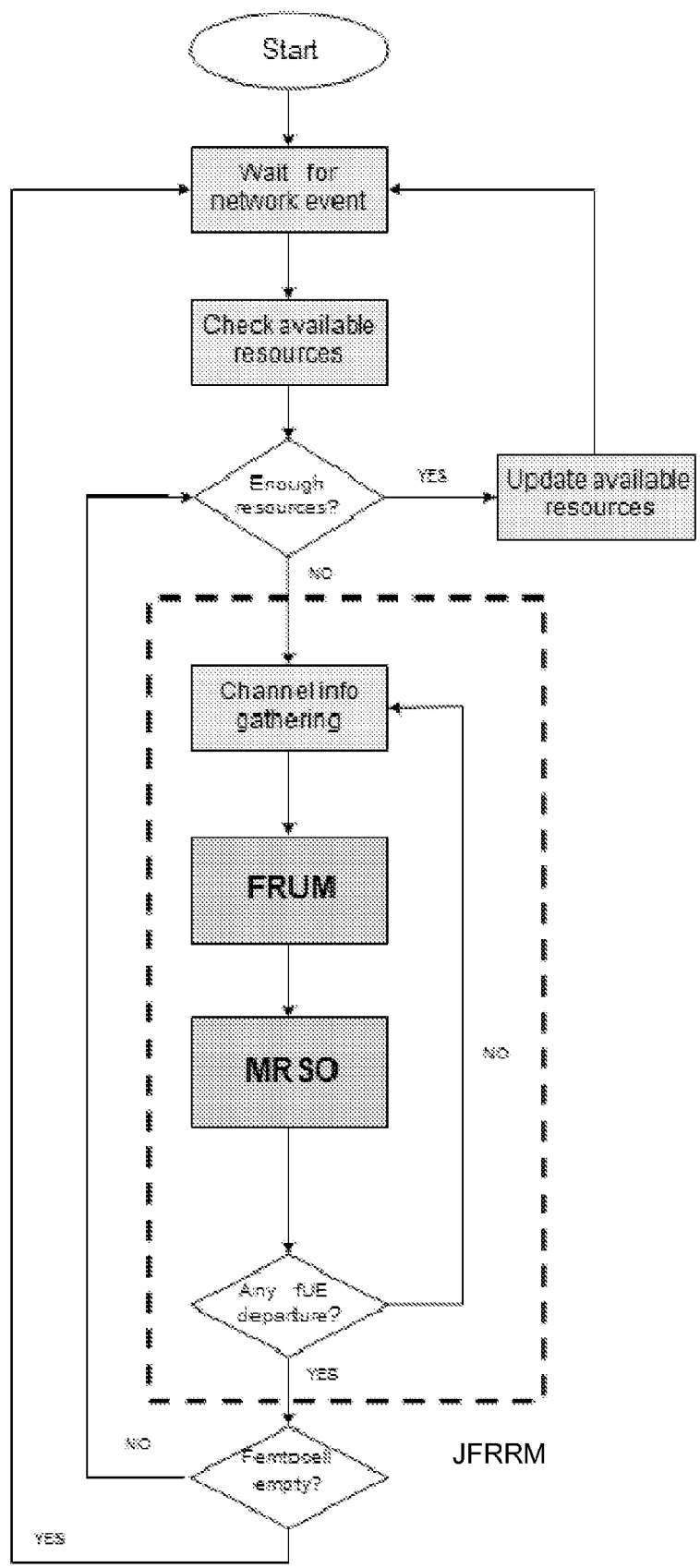
FIG. 8 provides a flow diagram for a method of allocating resources in a femto-relay system, in accordance with an exemplary embodiment of the present invention.

FIG. 8 provides a flow diagram illustrating a method of allocating resources in accordance with an exemplary embodiment of the present invention. The initial step is waiting for a network event to occur, e.g. a user initiates a call on a user equipment. Once a network event occurs, it is determined whether there are enough available resources to assign the necessary resources for that particular network event. If so, then those resources are assigned. If there are not enough available resources, then channel information is gathered about the fUEs 110 and mUEs 115 subscribing to the femto-relay system. Once the channel information is obtained, a FRUM step is performed followed by an MRSO step to allocate resources to the user equipments subscribing to the femto-relay system. The next step involves checking whether an fUE 110 has left the network. If not, the method returns to the step of gathering channel information. If an fUE 110 has left the network and there are still not enough available resources for fUE 110 service, the FRUM and MRSO steps are again performed. Otherwise, the method returns step of waiting for a network event.

In some embodiments of the present invention, the FRUM and MRSO steps can be formulated as optimization problems. F can be the set of fUEs 110, M the set of mUEs 115 susceptible to interference, N the set of subcarriers and S the set of OFDM symbols in one transmission time interval ("TTI").

Formulation of the FRUM optimization problem follows. In an exemplary embodiment of the present invention, an objective of the FRUM step is to minimize the amount of resources allocated to fUEs 110 while their requirements are satisfied. Let p(m,n,s) be defined as a resource allocation indicator; it simultaneously contains the information on the subcarrier and power allocation. That is, p(m,n,s)=x means that the $n^{th}$ subcarrier of the $s^{th}$ OFDM symbol is assigned to user m and the assigned transmit power on that specific resource is x. Otherwise, p(m,n,s)=0 means that user m has not been allocated that particular resource. Also, $R_m$ can be defined as the average data rate requirement of user m, $\bar{r}_m(t)$ can be defined as the average data rate of user m until TTI t, and $p_{max}$ can be defined as the maximum transmit power of the femto-relay system. The u(•) function is the step function whose value is one if the argument is greater than or equal to zero, and zero otherwise. Further, sign(•) is the sign function whose value is one in case the argument is larger than zero, zero in case the argument is zero, and negative one otherwise. Thus, for an exemplary embodiment of the present invention, the FRUM optimization problem can be mathematically formulated as shown in Equation 9, which is subject to Constraints 1-3.

$$\underset{p(m,n,s)}{\operatorname{argmin}} \sum_{m \in F} \sum_{n \in N} \sum_{s \in S} p(m, n, s) \qquad \text{Equation 9}$$

$$\sum_{m \in F} \operatorname{sign}(p(m, n, s)) \leq 1 \qquad \text{Constraint 1}$$
$$\forall n, s$$

$$u(\bar{r}_m(t) - R_m) = 1 \qquad \text{Constraint 2}$$
$$\forall t, \forall m \in F$$

$$\sum_{m \in F} \sum_{n \in N} \sum_{s \in S} p(m, n, s) \leq p_{max} \qquad \text{Constraint 3}$$

Constraint 1 ensures that one subcarrier is allocated to at most one fUE 110 at a time, i.e. little-to-no interference is present. Constraint 2 guarantees that all the fUEs 110 receive at least the requirements they are asking for, i.e. the first predetermined QoS threshold is satisfied. Constraint 3 represents the limit of the maximum transmission power of the femto-relay system.

Formulation of the MRSO optimization problem follows. In an exemplary embodiment of the present invention, an objective of the MRSO step is to reduce or minimize the interference suffered by the mUEs 115, i.e. minimize the number of mUEs 115 affected by interference from the femto-cell. Therefore, the optimization problem can be expressed in terms of achieving the maximum number of satisfied mUEs 115, i.e. mUEs 115 whose data rate requirements are satisfied. The nomenclature for the MRSO optimization problem formulation can be generally the same as the FRUM step above. To avoid confusion, however, p'(m,n,s) is defined as the allocated power to the $m^{th}$ mUE 115 on the $n^{th}$ subcarrier and $s^{th}$ OFDM symbol. Thus, the problem is formulated as shown in Equation 10, which is subject to Constraints 4-5.

$$\underset{p'(m, n, s)}{\operatorname{argmax}} \sum_{m \in M} u(\bar{r}_m(t) - R_m) \forall\, t \quad \text{Equation 10}$$

$$\sum_{m \in F} \operatorname{sign}(p(m, n, s)) + \sum_{m \in M} \operatorname{sign}(p'(m, n, s)) \leq 1 \forall\, n, s \quad \text{Constraint 4}$$

$$\sum_{m \in M} \sum_{n \in N} \sum_{s \in S} \operatorname{sign}(p'(m, n, s)) \leq$$
$$p_{max} - \sum_{m \in M} \sum_{n \in N} \sum_{s \in S} \operatorname{sign}(p'(m, n, s)) \quad \text{Constraint 5}$$

Constraint 4 prevents interference at mUEs 115, while including the allocation of power for fUEs 110. Constraint 5 limits the maximum transmission power, also taking into account the power that is utilized by the femto-relay system to serve the fUEs 110.

The exemplary formulations for the FRUM and MRSO problems described above are non-convex, such that the complexity of finding their optimal solutions can be prohibitively high. Accordingly, the present invention also provides two suboptimal methods for solving the FRUM and MRSO problems oriented towards more practical implementations in real systems.

It can be difficult for user equipments to feed back information on each single resource element (subcarrier and OFDM symbol); thus, in an exemplary suboptimal method, an RB—composed of a certain number of subcarriers and OFDM symbols—is the smallest resource unit that will be assigned to each user. Within each RB, the user equipment can compute an effective SINR value, which can be accomplished by means of the MIESM model discussed above. Equation 11 provides the effective SINR ($\gamma_{m,l}$) definition of user m on RB l, where I is the information measure defined as $I(x)=\log_2(1+x)$ and $n_f$ is the number of subcarriers in each RB.

$$\gamma_{m,l} = I^{-1}\left(\frac{1}{n_f} \sum_{i=1}^{n_f} I\left(\frac{C_{m,i}^l}{\sigma^2}\right)\right) \quad \text{Equation 11}$$

In an exemplary embodiment of the present invention, the general idea of the suboptimal method for solving the FRUM problem is that each fUE 110 receives its best resources to minimize the amount of allocated RBs. Additionally, margin-adaptive water-filling ("MAWF") can be employed to minimize the utilized power on the selected resources and meet the fUE's rate requirements. An exemplary suboptimal method:

1) Each fUE 110 selects its best RB in a round-robin fashion and prevents the rest of the users from choosing that RB.
2) After each selection, the achievable rate for that user is computed while assuming the femto-relay system is employing uniform power in each RB.
3) If, at any point, the rate requirements of any user are met, an MAWF algorithm is launched to determine the minimum necessary power for the set of selected resources. If resources are released, they are added to the pool of available RBs.
4) The fUE 110 is removed from the unsatisfied users list and the available power is updated.
5) To back to step 1 if there are still unsatisfied users.

In another exemplary embodiment of the present invention, the general idea of a suboptimal method of solving the MRSO problem is to maximize the number of satisfied mUEs. Thus, the mUEs 115 can be sorted through in increasing order of requested resources and serve as many of the mUEs 115 as possible from that list with the available resources of the femto-relay system. To do this, a similar approach to the FRUM method can be followed. First, a uniform power is assumed to select the mUE with the least requested RBs. Then, the power is minimized via MAWF. If a user cannot meet its requirements assuming uniform power distribution, it can be included in a "waiting list." When the rest of the users are served, MAWF is used to check whether there is available power to satisfy any mUEs on the waiting list. An exemplary suboptimal method comprises:

1) Obtain the number of RBs necessary to deliver $R_m$ to each mUE 115 given the available resources and assuming uniform power per RB.
2) Select the user that requires the minimum number of RBs. If any user cannot meet its requirements using the available resources and uniform power, it is included on the waiting list.
3) Allocate power to uniform-power satisfiable users following MAWF. If no such users exist, start serving users on the waiting list with a first-come/first-serve approach. Update remaining power and RBs.
4) Go back to step 1 as long as there are uniform-power satisfiable mUEs 115.
5) If at any point the femto-relay system runs out of resources to serve any of the remaining users, add those to an interference list.

FIGS. 9 and 10 provide pseudo-code for exemplary FRUM and MRSO methods, respectively. In the exemplary pseudo-coded methods, F(•) is the function that maps the SINR in data rates assuming uniform constant power, U and W are the sets of unsatisfied and waiting users, respectively, and L is the set of available RBs. The final resource allocation is stored in $P_{fUE}$ (power) and $L_{fUE}$ (RBs) for the fUEs and in $E_{mUE}$ and $N_{mUE}$ for the mUEs 115. I is a set that contains the mUEs 115 that may suffer interference after the resource allocation is performed.

In some embodiments of the present invention, the JFRRM 215 is configured to carry out the method of allocating resources in the femto-relay system. In an exemplary embodiment of the present invention, the JFRRM 215 can comprise instructions or logic stored in memory that, when executed by a processor, perform the various steps in the method of allocating resources in the femto-relay system described above. For example, the JFRRM 215 can comprise instructions or logic that implements the pseudo-coded methods illustrated in FIGS. 9 and 10.

Multi-Femto-Relay Systems

Femto-cells, by their very nature, provide service to a relatively small geographical area, especially in comparison to the coverage area of a macro-cell. Thus, there are often situations where multiple femto-cells may be needed to service an entire area. For example, a single femto-cell may not be able to provide adequate service to all locations of a tall office building or a sports stadium. In these situations, it may be desirable to place a plurality of femto-cells throughout the building or stadium to ensure users may access one of the femto-cells no matter where that person is located in or around the building or stadium. Unfortunately, placing multiple femto-cells in relative proximity to each other can cause the femto-cells to interfere both with each other and the outside network. Thus, some embodiments of the present invention provide multi-femto-relay systems that manage a plurality of femto-cells to improve radio-resource management with reduced interference.

Figure 11A:
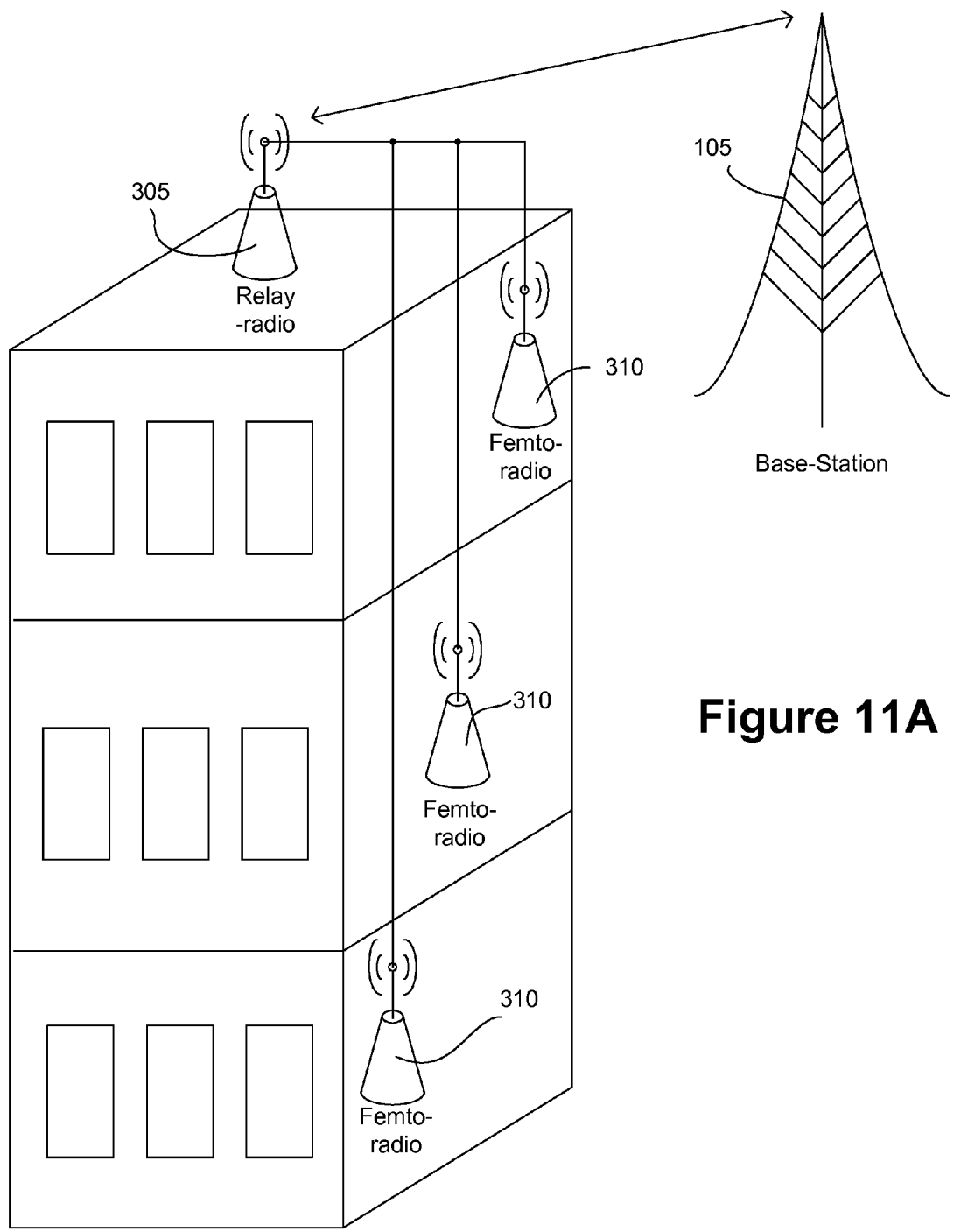
FIG. 11A illustrates a multi-femto-relay system configured with a star topology, in accordance with an exemplary embodiment of the present invention.
Figure 11B:
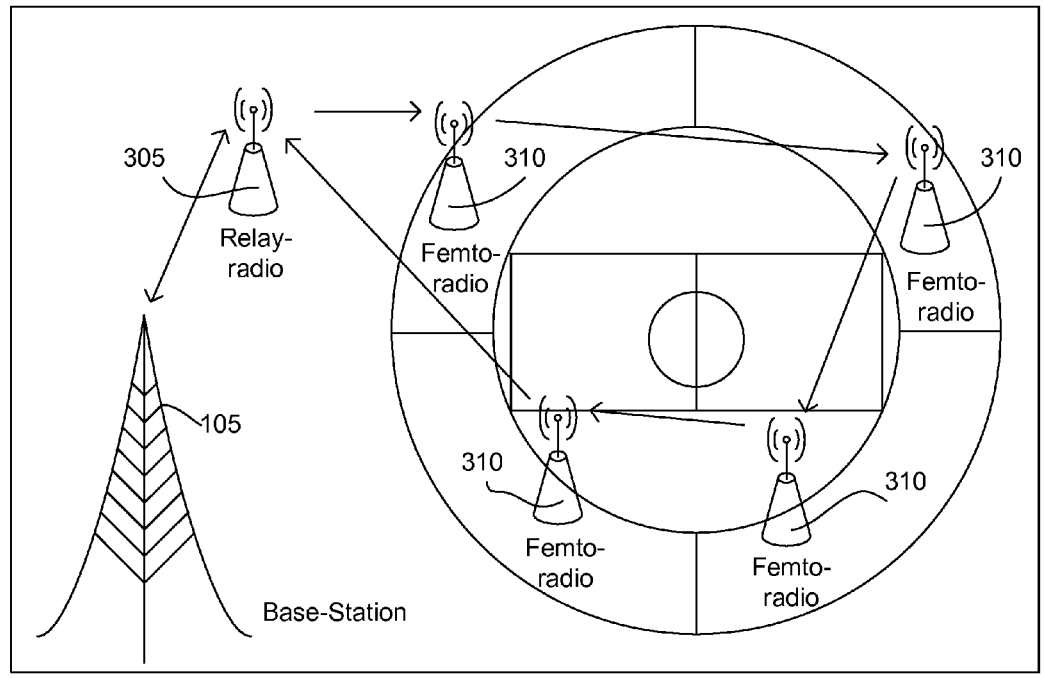
FIG. 11B illustrates a multi-femto-relay system configured with a ring topology, in accordance with an exemplary embodiment of the present invention.
Figure 11C:
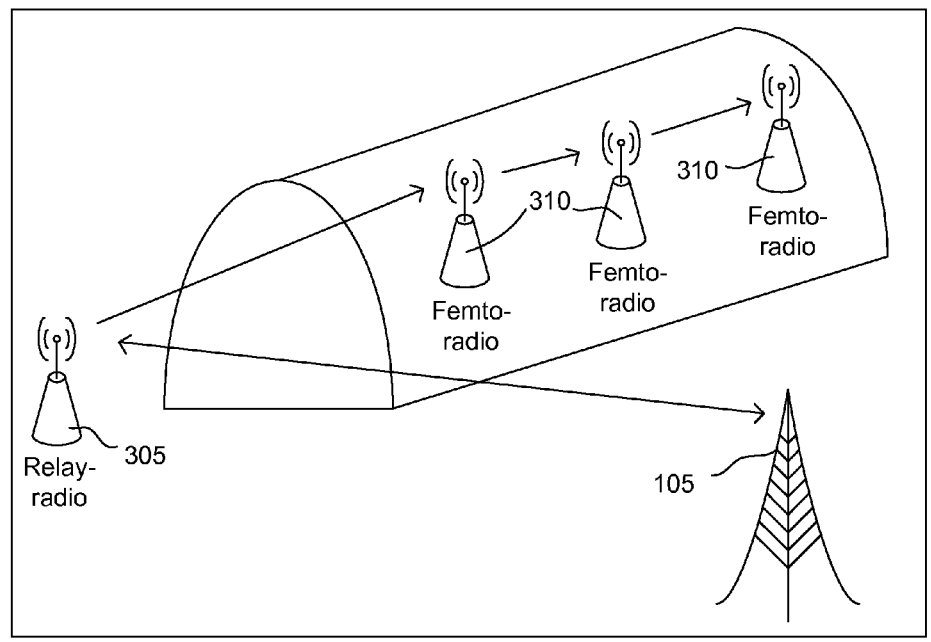
FIG. 11C illustrates a multi-femto-relay system configured with a bus topology, in accordance with an exemplary embodiment of the present invention.

As shown in FIGS. 11A-11C, an exemplary embodiment of the present invention provides a multi-femto-relay system comprising a relay-radio 305 and a plurality of femto-radios 310 in communication with the relay-radio 305. The femto-radios 310 can be spread out geographically, e.g. placed on different floors of a building, to provide service to user equipments in a larger geographical area than a single femto-cell. The multi-femto-relay system can be arranged in many different topologies. In an exemplary embodiment of the present invention, the multi-femto-relay system is arranged in a star topology as shown in FIG. 11A. In another exemplary embodiment of the present invention, the multi-femto-relay system is arranged in a ring topology as shown in FIG. 11B. In yet another exemplary embodiment of the present invention, the multi-femto-relay system can be arranged in a bus topology as shown in FIG. 11C. In accordance with various embodiments of the present invention, the multi-femto-relay system can be arranged through many different topologies, such as combinations and variations of the star, ring, and bus topologies.

Communication between the relay-radio 305 and the femto-radios 310 can be either wired, wireless, or a combination thereof. Additionally, the relay-radio 305 and the femto-radios 310 can be in communication via either direct connection or an indirect connection comprising at least one repeater unit. In an exemplary embodiment of the present invention, the at least one repeater unit is a femto-radio 310. The relay-radio 305 can also be in communication with a macro-cell base-station 105. The relay-radio 305 can be in communication with a macro-cell base-station 105 via either a direct connection or an indirect connection comprising at least one repeater unit. In an exemplary embodiment of the present invention, the at least one repeater unit is another relay-radio 305.

Figure 12A:
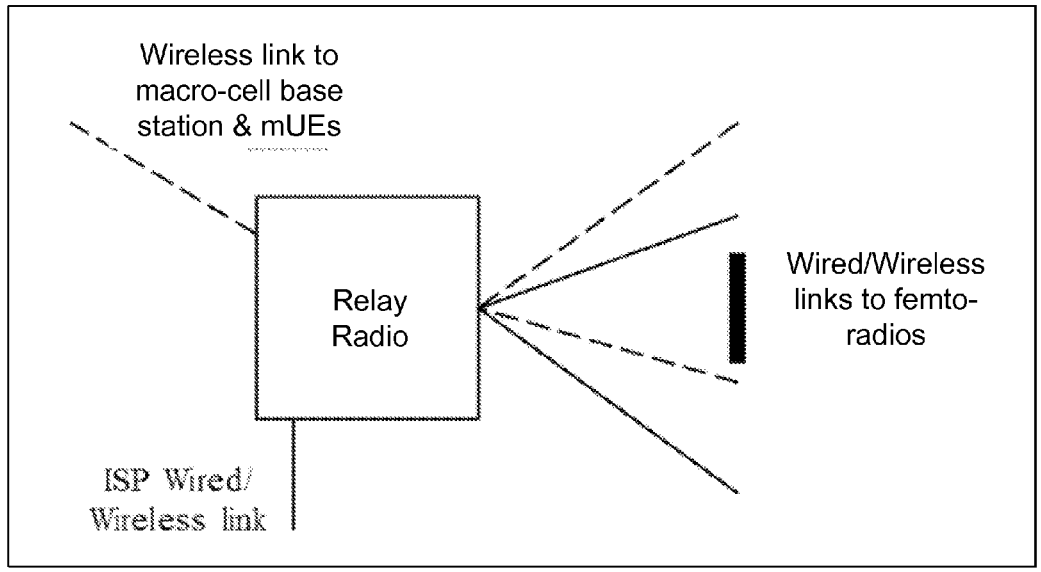
FIG. 12A illustrates the communication links associated with a relay-radio having an IP-Backhaul link, in accordance with an exemplary embodiment of the present invention.
Figure 12B:
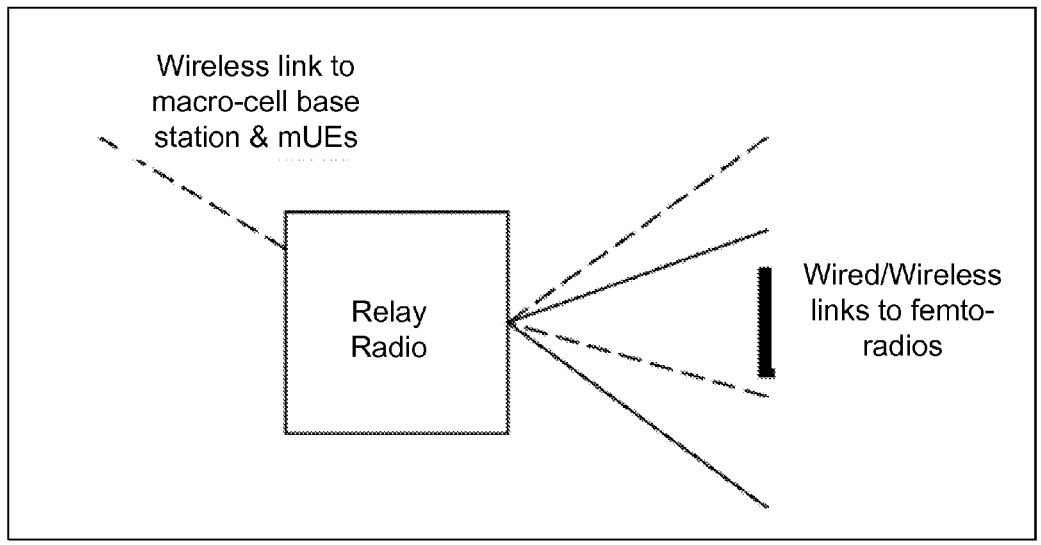
FIG. 12B illustrates the communication links associated with a relay-radio without an IP-backhaul link, in accordance with an exemplary embodiment of the present invention.

FIGS. 12A-12B illustrate the links associated with a relay-radio 305, in accordance with an exemplary embodiment of the present invention. The relay-radio 305 can have a wireless link that can be used to communicate with the macro-cell base-station 105 and/or mUEs 115. Additionally, the relay-radio 305 can have a IP-backhaul link 335, which can provide communication between the relay-radio 305 and a core cellular network. Thus, in an exemplary embodiment of the present invention, the IP-backhaul link 335 of the relay-radio 305 can be used to route signals between a core network and fUEs 110.

Figure 13A:
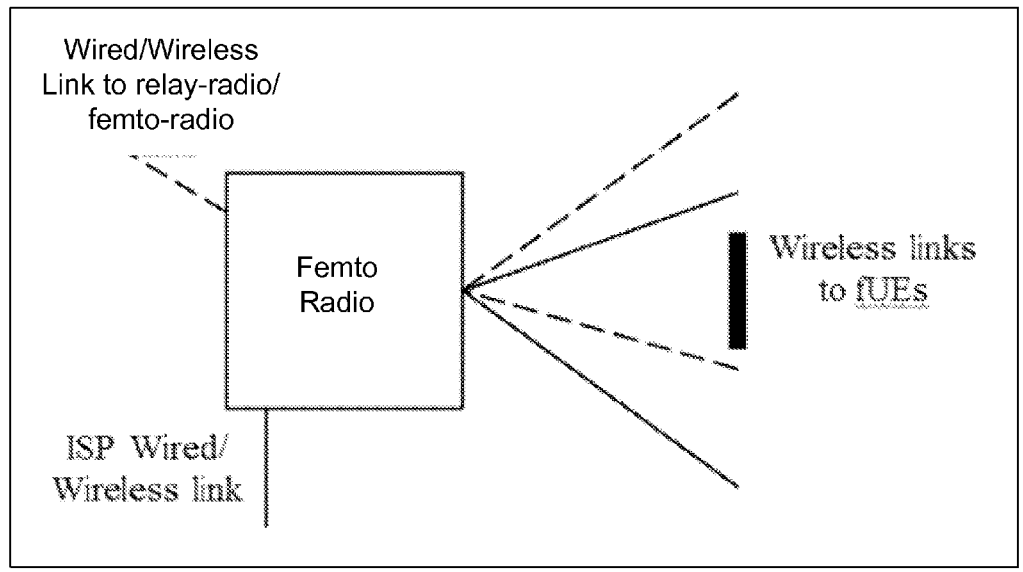
FIG. 13A illustrates the communication links associated with a femto-radio having an IP-Backhaul link, in accordance with an exemplary embodiment of the present invention.
Figure 13B:
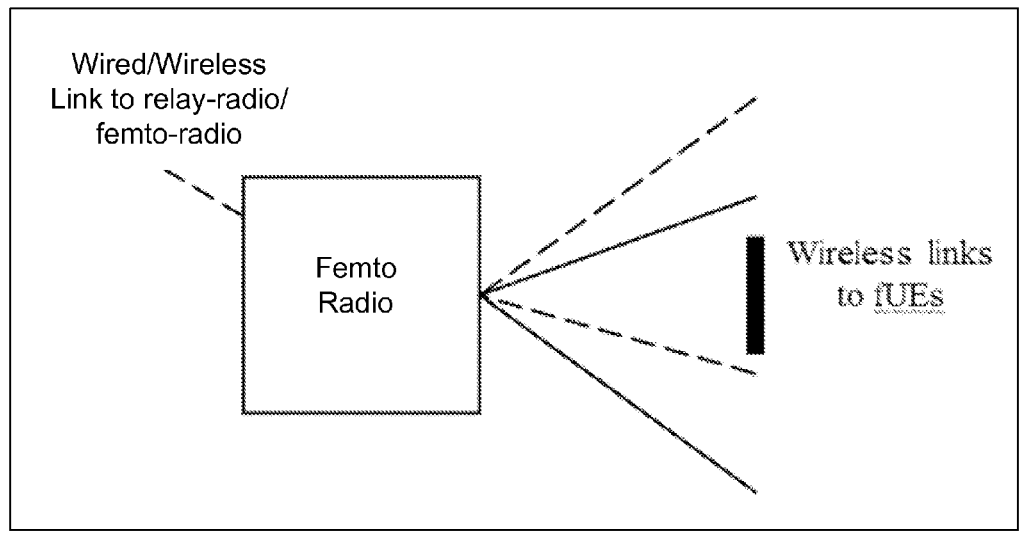
FIG. 13B illustrates the communication links associated with a femto-radio without an IP-backhaul link, in accordance with an exemplary embodiment of the present invention.

FIGS. 13A-13B illustrate the links associated with a femto-radio 310, in accordance with an exemplary embodiment of the present invention. Each femto-radio 310 can have wireless links that can communicate with the relay-radio 305, fUEs 110, and/or, mUEs 115. Additionally, one or more femto-radios 310 can have an IP-backhaul link 335, which can be used to provide communication between the one or more femto-radios 310 and a core cellular network. Thus, in an exemplary embodiment of the present invention, the IP-backhaul link 335 of a femto-radio 310 can route signals between a core network and fUEs 110.

Figure 14A:
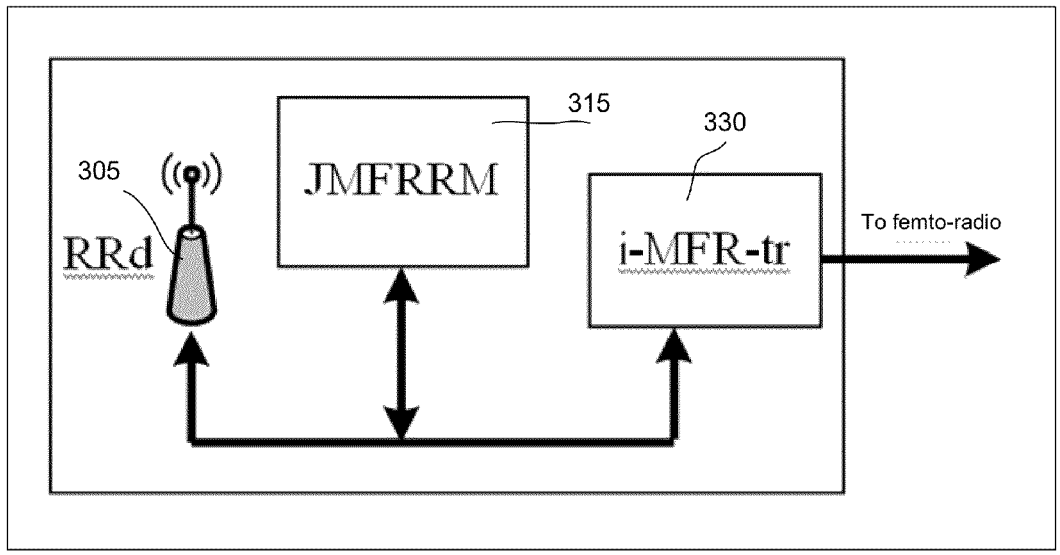
FIG. 14A provides a conceptual view of a relay-radio component, in accordance with an exemplary embodiment of the present invention.

As shown in FIG. 14A, the relay-radio 305 can comprise a Joint Multi-Femto-Relay Resource Management module ("JMFRRM") 315. The JMFRRM 315 can be configured to intelligently manage the multi-femto-relay system's resources between the relay-radio 305 and the plurality of femto-radios 310 to reduce interference between the macro-cell and femto-cell networks and among the femto-cells managed by the relay-radio 305. To enable the JMFRRM 315 to perform these tasks, in some embodiments of the present invention, the femto-radios 310 obtain channel information regarding the fUEs 110, the relay-radio 305 obtains channel information regarding the mUEs 115, and an intra-multi-femto-relay-transceiver ("i-MFR-tr") 330 of the relay-radio obtains information regarding the links between the relay-radio 305 and the femto-radios 310. In an exemplary embodiment of the present invention, the JMFRRM 315 assigns resources to the links of the multi-femto-relay system based on this information along with other constraints, such as energy, priorities, data rates, and the like.

In some embodiments of the present invention, the relay-radio 305 comprises an IP-backhaul QoS monitoring module 320. The IP-backhaul QoS monitoring module 320 of the relay-radio 305 can be similar to the IP-backhaul QoS monitoring module 220 described earlier in the context of the femto-relay system. In an exemplary embodiment of the present invention, the IP-backhaul QoS monitoring module 320 monitors the QoS being delivered by an IP-backhaul link 335 of the relay-radio 305 and notifies the relay-radio 305 to route signals to and from an fUE 110 and/or mUE 115 through the macro-cell base-station 105 if the QoS falls below a predetermined threshold. For example, if an fUE 110 subscribing to a first femto-radio 305 is transmitting and receiving signals to and from a core network via an IP-backhaul 335 of the relay-radio 305, the IP-backhaul QoS monitoring module 320 can monitor the QoS being delivered by the IP-backhaul link 335, and if the QoS falls below a predetermined threshold, the signals communicated between the fUE 110 and the core network can be rerouted through the macro-cell base-station 105.

In some embodiments of the present invention, one or more femto-radios 310 of the multi-femto-relay system comprise a IP-backhaul QoS monitoring module 320. The IP-backhaul QoS monitoring module 320 of the femto-radios can be similar to the IP-backhaul QoS monitoring module 220 described earlier in the context of the femto-relay system. In an exemplary embodiment of the present invention, the IP-backhaul QoS monitoring module 320 of the one or more femto-radios monitors the QoS being delivered by the IP-backhaul link 335 of the respective femto-radio 310 and notifies the relay-radio 305 to route signals to and from an fUE 110 and/or mUE 115, which is subscribing to the femto-radio 310, through the macro-cell base-station 105 if the QoS falls below a predetermined threshold. For example, if an fUE 110 is transmitting and receiving signals to and from a core network via an IP-backhaul link 335 of the femto-radio 310, the IP-backhaul QoS monitoring module 320 can monitor the QoS being delivered by the IP-backhaul link 335, and if the QoS falls below a predetermined threshold, the signals being communicated between the fUE 110 and the core network can be rerouted through the macro-cell base-station 105. In an exemplary embodiment of the present invention, if both the relay-radio 305 and one of more femto-radios 310 each have an IP-backhaul QoS monitoring module 320, the IP-backhaul QoS monitoring module 320 of the one or more femto-radios 310 can coordinate operations with the IP-backhaul QoS monitoring module 320 of the relay-radio 305.

Figure 14B:
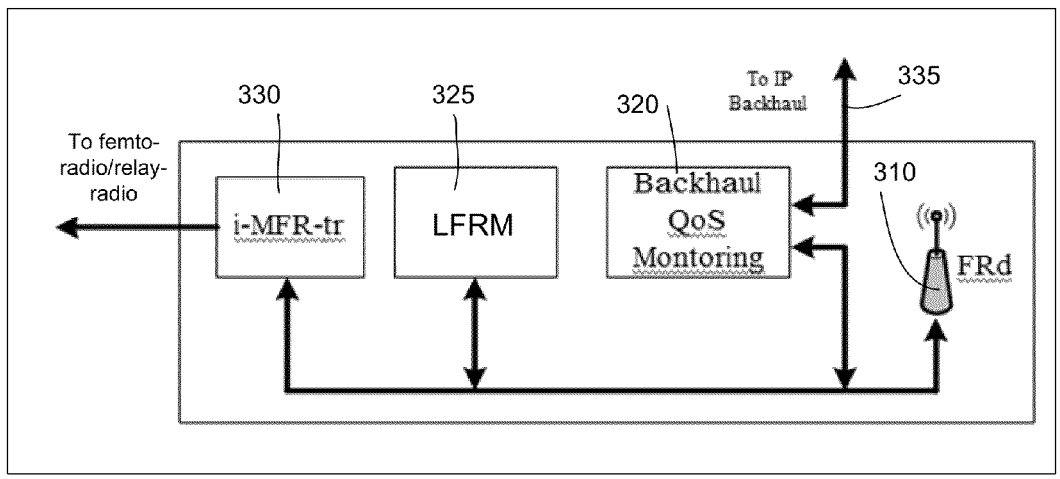
FIG. 14B provides a conceptual view of a femto-radio component, in accordance with an exemplary embodiment of the present invention.

As shown in FIG. 14B, in some embodiments of the present invention, one or more femto-radios 310 of the multi-femto-relay system can comprise a Local Femto Resource Management module ("LFRM") 325. The LFRM 325 can be similar to the JFRRM 215 described earlier in the context of the femto-relay system. In an exemplary embodiment of the present invention, the LFRM 325 is configured to manage resources assigned to the femto-radio by the JMFRRM 315 to reduce interference between the fUEs 110 subscribing to the femto-radio 310. In some embodiments of the present invention, the LFRM 325 assigns a different subcarrier to each fUE 110 subscribing to the femto-radio 310. In some embodiments of the present invention, the LFRM 325 assigns different orthogonal spreading codes to the fUEs 110 subscribing to the femto-radio 310. In an exemplary embodiment of the present invention, the LFRM 325 obtains channel information regarding the fUEs 110, sends at least a subset of that information to the JMFRRM 315, and receives resource assignments and policies (that indicate how these resources can be used) from the JMFRRM 315. By taking into account information received by the JMFRRM 315, and other constraints, such as energy, priorities, data rates, and the like, the LFRM 325 can be configured to assign resources to the set of fUEs 110 served by the femto-radio 310.

Figure 15:
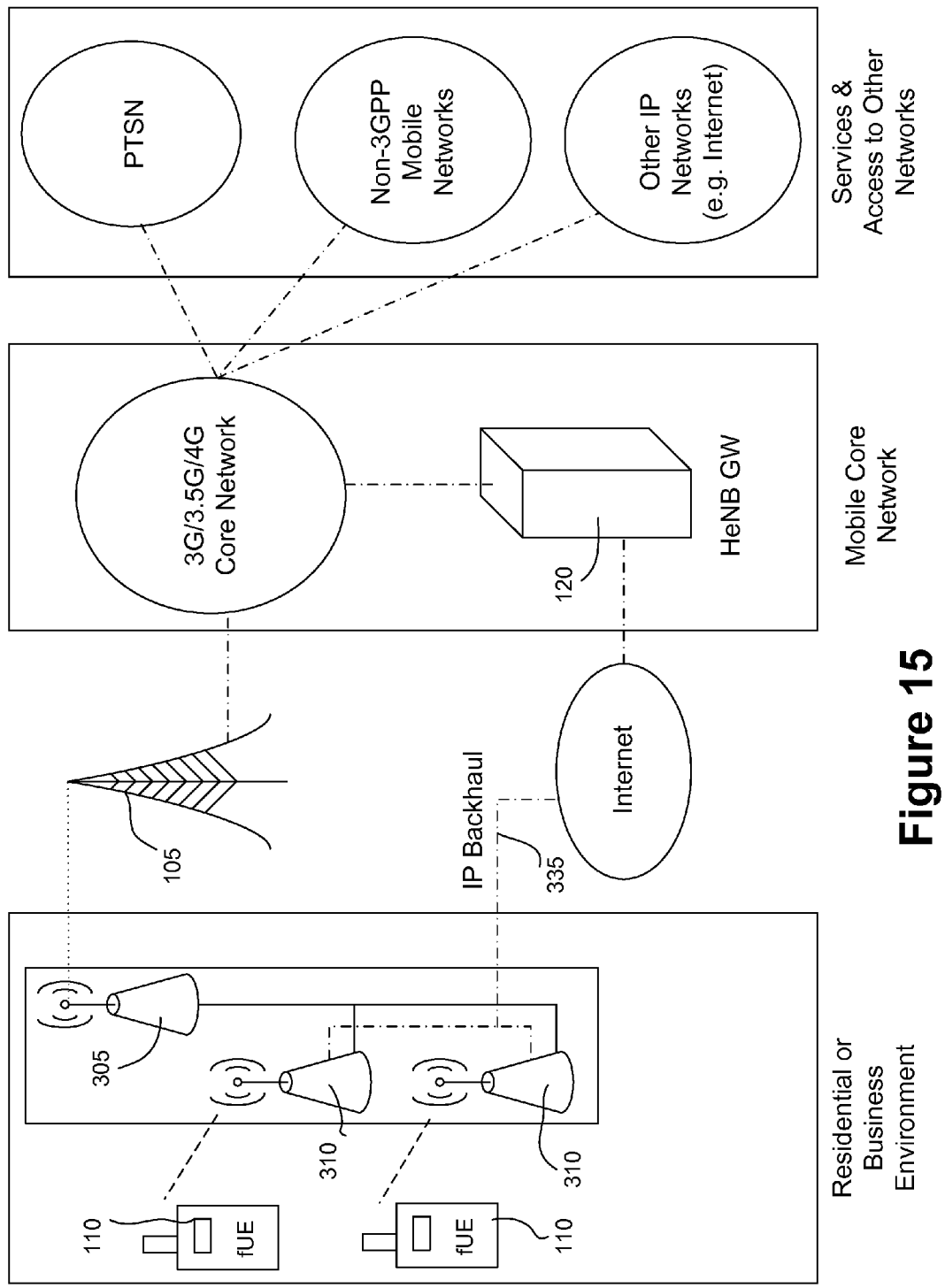
FIG. 15 illustrates a multi-femto-relay system incorporated into a wireless network, in accordance with an exemplary embodiment of the present invention.

FIG. 15 illustrates a multi-femto-relay system incorporated into a wireless cellular network in accordance with an exemplary embodiment of the present invention. In the exemplary multi-femto-relay system shown in FIG. 15, the relay-radio 305 has no IP-backhaul link 335, but each femto-radio 310 has an IP-backhaul link 335, where the 3GPP network architecture is taken as a reference. The HeNB GW 120 can be the entity in charge of concentrating a large number of uncoordinated HeNBs, which is the 3GPP's name for FAPs. The IP-backhaul links 335 provide a connection to the core network of the wireless service provider, through which most of the cellular traffic can be offloaded from the macro-cell network.

Figures 16A, 16B:
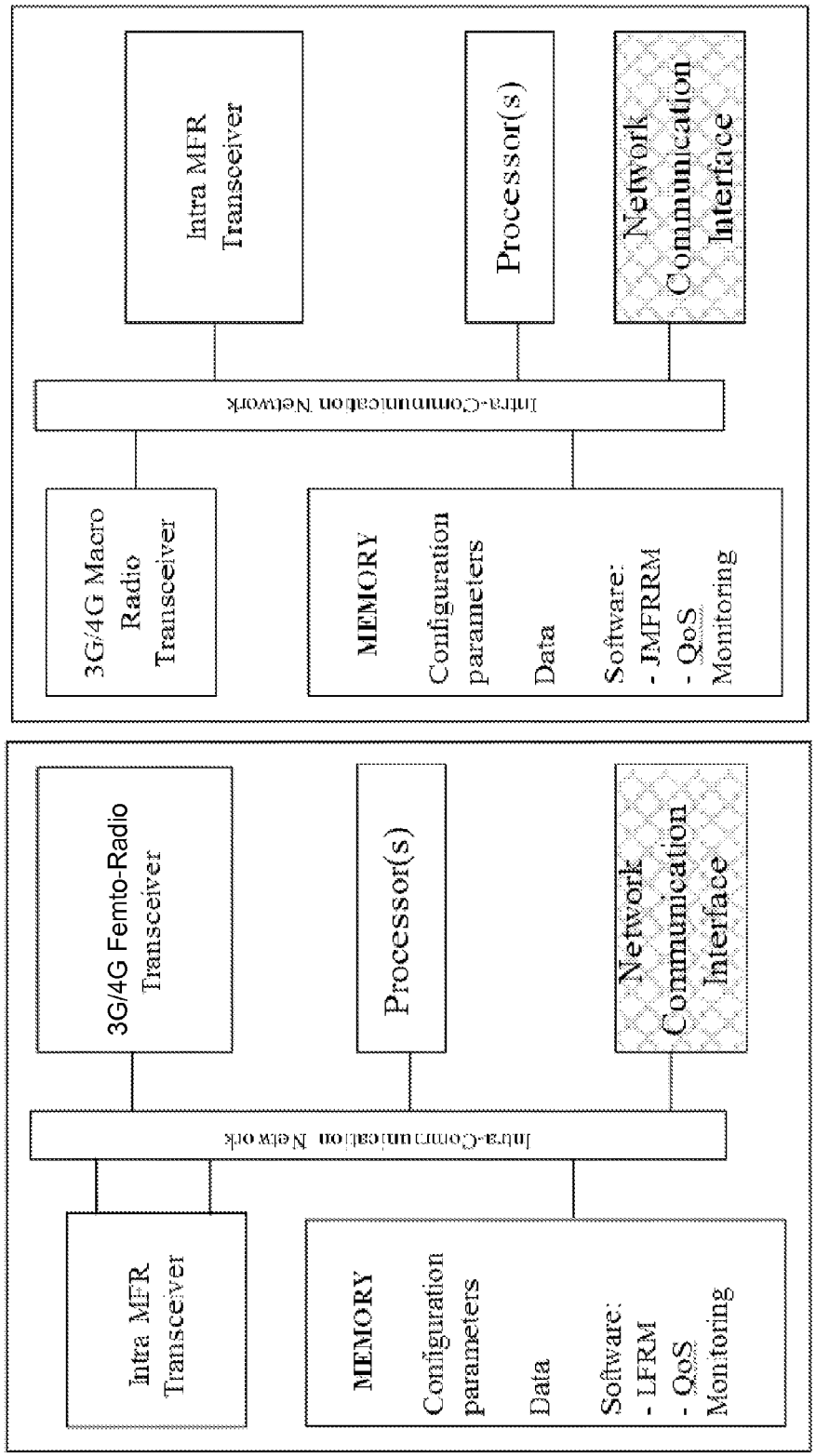
FIG. 16A provides a block diagram of hardware components for a relay-radio, in accordance with an exemplary embodiment of the present invention.
FIG. 16B provides a block diagram of hardware components for a femto-radio, in accordance with an exemplary embodiment of the present invention.

FIG. 16A provides a block diagram of hardware components of a relay-radio 305 in a multi-femto-relay system, in accordance with an exemplary embodiment of the present invention. A macro-radio transceiver, i-MFR-tr 330, processor, network communications interface, and memory are each in communication with an intra-communication network. The macro-radio transceiver can allow communication with the macro-cell base-station 105 and/or mUEs 115. The i-MFR-tr 330 can allow the relay-radio to communicate with one or more femto-radios 310. The memory can store instructions implemented by the processor. In an exemplary embodiment of the present invention, the IP-backhaul QoS monitoring module 320 of the relay-radio 305 and/or the LFRM 325 each comprise instructions stored in memory, which can be implemented by the processor to carry out the various functions described herein. In some embodiments of the present invention, the modules each have a distinct memory and processor. In some embodiments of the present invention, the modules share a common memory and/or processor. The network communications interface can maintain a connection with the service provider's core network via the IP-backhaul link 335. Many technologies can be used to connect the relay-radio 305 to the internet via the IP-backhaul link 335, including, but not limited to, Ethernet, Token Ring, ATM LAN, and the like. The memory may be many storage devices known in the art, including, but not limited to, hard disks, flash memories, flash disks, and the like. In addition to the modules' instructions discussed above, the contents of the memory can comprise configuration parameters and other general data. The configuration parameters may include information used for the multi-femto-relay system to operate in wireless networks, including, but not limited to, duplexing mode, uplink and downlink frequencies, network and site IDs, number of supported users, and the like. The memory can also store any intermediate and final results during the multi-femto-relay system's operation in a location, such as the section addressed "Data" in FIG. 16A.

FIG. 16B provides a block diagram of hardware components of a femto-radio in a multi-femto-relay system, in accordance with an exemplary embodiment of the present invention. A femto-radio transceiver, i-MFR-tr 330, processor, network communications interface, and memory are each in communication with a shared bus. The femto-radio transceiver can allow communication with the fUEs 110 and/or mUEs 115. The i-MFR-tr 330 can allow the femto-radio 310 to communicate with the relay-radio 305. The memory can store instructions implemented by the processor. In an exemplary embodiment of the present invention, the IP-backhaul QoS monitoring module 320 of the femto-radio 310 and/or the LFRM 325 each comprise instructions stored in memory, which can be implemented by the processor to carry out the various functions described herein. In some embodiments of the present invention, the modules each have a distinct memory and processor. In some embodiments of the present invention, the modules share a common memory and/or processor. The network communications interface can maintain a connection with the service provider's core network via the IP-backhaul link 335. Many technologies can be used to connect the femto-radio to the internet via the IP-backhaul link 335, including, but not limited to, Ethernet, Token Ring, ATM LAN, and the like. The memory may be many storage devices known in the art, including, but not limited to, hard disks, flash memories, flash disks, and the like. In addition to the modules' instructions discussed above, the contents of the memory can comprise configuration parameters and other general data. The configuration parameters may include information used for the multi-femto-relay system to operate in wireless networks, including, but not limited to, duplexing mode, uplink and downlink frequencies, network and site IDs, number of supported users, and the like. The memory can also store any intermediate and final results during the multi-femto-relay system's operation in a location, such as the section addressed "Data" in FIG. 16B.

In various embodiments of the present invention, the femto-radios and relay-radio can operate in many systems belonging to the 3G and 4G family of standards, i.e. UMTS, HSPA, HSPA+, LTE, LTE-A, and the like. Further, as those skilled in the art would understand, the scope of the present invention is not limited to 3G and 4G standards, but instead, embodiments of the present invention may be used with systems belonging to other generations of wireless standards, including those generations of wireless standards developed in the future.

Multi-Femto-Relay Resource Management and Interference Reduction

Figure 17:
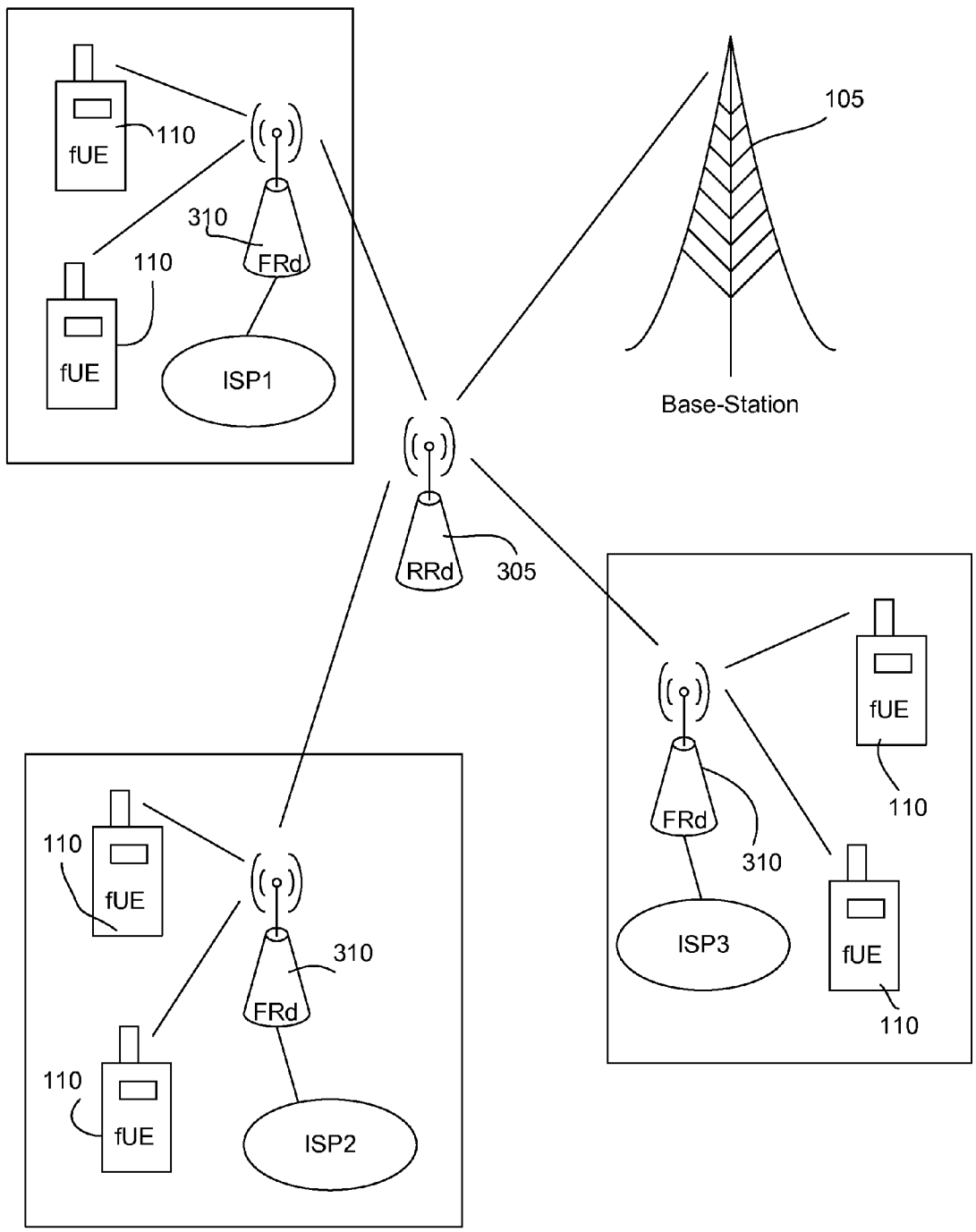
FIG. 17 provides a system model for a multi-femto-relay system arranged in a star topology, in accordance with an exemplary embodiment of the present invention.

Exemplary embodiments of the present invention provide methods of managing resources in multi-femto-relay systems. To better understand operation of some of these exemplary embodiments, the system model of the exemplary multi-femto-relay system shown in FIG. 17 will now be described. Following the approach of LTE, LTE-Advanced and 802.16m, the exemplary system is based on OFDMA. It can be assumed that the number of available OFDMA subcarriers is N, the number of femto-radios 310 is M and the number of fUEs is K. Each subcarrier, within a femto-radio 310, can be assigned to a single fUE 110 (assuming there are no simultaneous transmissions to more than one user in a single subcarrier within a femto-radio 310). Additionally, it can be assumed that each fUE 110 is served exclusively by a single femto-radio 310, as would occur in a closed subscriber group ("CSG") femto-radio deployment.

In the exemplary channel model, $h_{m,k}{}^n$ can denote the channel gain from femto-radio m to fUE k at subcarrier n, and $\epsilon_m{}^n$ can denote the transmit energy of femto-radio m at subcarrier n. If user a is served by femto-radio b at subcarrier c, then the achievable rate of fUE a at subcarrier c can be defined by Equation 12.

$$R_{b,a}^c = \log_2(1 + SINR_a^c) = \log_2\left(1 + \frac{\varepsilon_b^c |h_{b,a}^c|^2}{(\sigma_a^n)^2 + \sum_{l \neq b} |h_{l,a}^c|^2 \varepsilon_l^c}\right) \quad \text{Equation 12}$$

In Equation 12, $SINR_a{}^c$ represents the signal to interference-and-noise radio of fUE a at subcarrier c, $(\sigma_a{}^n)^2$ denotes the noise power, and the second term of the SINR represents the interference from the rest of the femto-radios.

In the exemplary channel model, $N_{b,a}$ can denote the set of subcarrier assigned by the femto-radio b to user a. Then, the total achievable data rate of fUE a, served by femto-radio b can be represented by Equation 13.

$$R_{b,a} = \sum_{n \in N_{b,a}} R_{b,a}^n \quad \text{Equation 13}$$

Given Equation 12 and 13, in an exemplary embodiment of the present invention, the total transmit energy within the multi-femto-relay network is minimized, subject to minimum data rate requirements for each fUE 110 and maximum transmission powers for each femto-radio 310. This can be formulated by Equation 14 subject to Constraints 6-7.

$$\min \sum_{l=1}^{M} \sum_{n=1}^{N} \varepsilon_l^n \quad \text{Equation 14}$$

$$R_{b,a} \geq R_{a_{min}} \quad \text{Constraint 6}$$
$$\forall a \in \{1, \ldots, K\}$$

$$\sum_{n=1}^{N} \varepsilon_l^n \leq \varepsilon_{l_{max}} \quad \text{Constraint 7}$$
$$\forall l \in \{1, \ldots, M\}$$

In some embodiments of the present invention, satisfying the rate requirement of each fUE 110 can be more important than simply maximizing the total capacity of the network, which typically involves ignoring users with low channel quality, while minimizing the transmit energy reduces the inter-femto-radio interference and any potential interference to mUEs 115.

The optimization problem in Equation 14 can be NP-hard, and an obtaining an optimal solution may be unpractical, such that suboptimal solutions are desired. In some embodiments of the present invention, interference among femto-radios 310 can be ignored, such that each femto-radio can perform an independent multi-user energy minimization water-filing, for which an optimal solution, with complexity of $O(NK^3)$, can be obtained for a practical number of subcarriers, even though the basic problem is non-convex. In some embodiments of the present invention, however, inter-femto-cell interference cannot be ignored; thus, various embodiments of the present invention provide systems and methods for intelligently and efficiently managing resources for a multi-femto-relay while taking into account the inter-femto-radio interference.

In an exemplary embodiment of the present invention, it can be assumed that the femto-radios have complete knowledge of the channel gains at each subcarrier to each fUE. Even though this is an ideal case, in indoor environments, the variations of the channel gains are slow, which permits a good estimation of them. In an exemplary embodiment of the present invention, it can also be assumed that each femto-radio 310 has the same characteristics, in terms of supported bandwidth, frequency range, and maximum transmission power. Additionally, in some embodiments of the present invention, the relay-radio 305 can exchange information regarding relay resource management and femto-radio capabilities with all of the femto-radios 310.

In some embodiments of the present invention, as discussed above, the JMFRRM 315 can be in charge of allocating and managing resources within the multi-femto-relay system. In various embodiments of the present invention, the JMFRRM 315 can implement different methods of resource allocation. In an exemplary embodiment of the present invention, a method of resource allocation in a multi-femto-relay system comprises the following steps:

1) Identify which fUEs 110, within the multi-femto-relay system, are experiencing the best channel conditions (ignoring interference) at each available subcarrier.
2) Assign to the fUEs 110 selected in step 1, orthogonal subcarriers and energy to minimize the total transmission energy, and satisfy their minimum data rate requirements.
3) The remaining energy (per femto-radio) is substantially uniformly distributed among the subcarriers that were not selected in step 2 at each femto-radio.
4) For the fUEs 110 of step 2, the energy is increased to compensate for the interference caused by the assignment of energy to subcarriers that was done at step 3.
5) Using the subcarriers of step 3, the fUEs 110 not selected in step 1 that are experiencing the best channel conditions (taking into account interference) are allocated subcarriers in order to satisfy their minimum data rate requirements.

In the following three paragraphs, an explanation of the above exemplary method is provided. From the well known water-filling algorithm for a single user, it is known that to minimize the transmission energy (or maximize the data rate), the subcarriers with the best channel conditions can be used. In the multi-user case, with equal user priority, the selection of users with best channel conditions at each subcarrier still holds. Based on these ideas, step 1 selects the users with the best channel conditions, and step 2 assigns resources and energy to these users.

As a suboptimal approach to water-filling, it has been shown that the use of constant-power water-filling can greatly simplify the complexity of water-filling algorithms, while still achieving negligible performance degradation compared to true water-filling, as long as the optimal subcarriers are used. This motivates the energy distribution of step 3. The justification for step 4 is to compensate for the interference caused by the previous resource allocation. The resource allocation done in step 5 is beneficial because it doesn't increase the interference to users of step 1, while, at the same time, can be performed independently for each femto-radio 310.

Each step in the exemplary method above can be mapped to the elements of the multi-femto-relay system to achieve a combination of centralized (at the relay-radio 305) and distributed (at the femto-radios 310) algorithms. For step 1, each femto-radio 310 can report the users that are experiencing the best channel conditions and the channel conditions. The relay-radio 305, using these reports, can perform steps 1 and 2. Given that the relay-radio 305 can also be aware of the maximum transmission power of each femto-radio 310, it can also perform steps 3 and 4 without any additional information from the femto-radios 310. Additionally, the relay-radio 305 can report back the results of step 4 to the femto-radios 310. Step 5 can be performed in a distributed way by each femto-radio 310. For step 5, the femto-radios 310 can be in charge of reporting to the relay-radio 305 if any fUE 110 was not served or the target data rate was not achieved. Then, in some embodiments of the present invention, the relay-radio 305 can perform scheduling in time for the next time slots.

In an exemplary embodiment of the present invention, the method of allocating resources, which can be performed by the JMFRRM 315, is based on three algorithms. First, a joint relay resource management algorithm in charge of coordinating various functions in the method of allocating resources. Second, a centralized multi-user and multi-femto-radio energy minimization water-filling ("C-MWF") algorithm in charge of performing steps 2-4 of the exemplary method discussed above. The C-MWF algorithm can receive, as an input, the reports of each femto-radio 310 regarding the fUEs 110 with the best channel conditions at each subcarrier. The algorithm can also identify the fUEs 110 that should be scheduled at each subcarrier, and the respective amount of energy, taking into account a maximum level of expected interference per subcarrier. Third, a distributed multi-user energy minimization water filling ("D-MWF") algorithm is in charge of performing step 5 of the exemplary method discussed above. The D-MWF algorithm can receive, as an input, a set of available subcarrier, a set of fUEs 110 that need to be scheduled, and energy constraints (minimum, maximum, and per subcarrier). The objective of this algorithm is to satisfy as many fUEs 110 as possible subject to the previous constraints.

These three algorithms depend on two other algorithms, which are a constant-power single-user energy minimization water-filing ("CP-SWF") algorithm and a constant-power subcarrier utilization reduction ("CP-SUR") algorithm. Various embodiments of the present invention can comprise memory storing instructions that can be implemented by a processor to carry out the various functions of these algorithms. The present invention is not limited to the exemplary algorithms discussed herein. Instead, many algorithms can be used to implement the various steps of the present invention. The details of each of the five exemplary algorithms above will now be discussed.

CP-SWF Algorithm

The CP-SWF algorithm can perform a constant-power, energy-minimization water-filling for a single user, subject to a minimum data rate requirement, minimum total energy, and maximum total energy constraints. In an exemplary embodiment of the present invention, the algorithm can perform a binary search among the valid range of energies, for all the possible number of subcarriers that can be used. Through this binary search, the minimum energy is found for each configuration of number of subcarriers. Then the configuration of subcarriers that provides the minimum energy can be selected.

Exemplary pseudo-code for implementing the CP-SWF algorithm is provided below.

```
1:  for k = 1 to N do
2:      ε_{min_temp} = ε_{min}, ε_{max_temp} = ε_{max}
3:      for j = 1 to p do
4:          ε_{mid} = √(ε_{min_temp} ε_{max_temp})
5:          ∀n∈N, compute b_n = log_2 (1 + ε_{mid} g_n)
6:          R_k = sum of k biggest b_n
7:          if R_k > R_{min} then
8:              ε_{max_temp} = ε_{mid}
9:              sat_k = true
10:         else
11:             ε_{min_temp} = ε_{mid}
12:         end if
13:     end for
14:     if sat_k = true then
15:         ε_k = ε_{max_temp}, ε_{avg_k} = ε_k / k
16:     end if
17: end for
18: The minimum total energy is: ε_{min_t} = min 1 ≤ k ≤ N ε_k sat_k = true
```

In the exemplary pseudo-code, N denotes the set of subcarriers, N=|N| denotes the number of subcarriers in the set, $R_{min}$ denotes the minimum data rate, $\epsilon_{min}$ denotes the minimum total energy, and $\epsilon_{max}$ denotes the maximum total energy. The number of subcarriers that need to be used is the value of k that minimized the expression at line 18. The subcarriers that should be used can be recovered from lines 5 and 6 by replacing $\epsilon_{mid}$ with $\epsilon_{min_t}$. $g_n$ denotes the "channel gain-to-noise ratio" or "channel gain-to-noise and interference ratio" (depending on how the function is used) for subcarrier n, and is represented in Equation 15 as a function of the channel gain $h_n$ at subcarrier n, where $\Psi$ denotes the interference.

$$g_n = \frac{|h_n|^2}{\text{noise}} \text{ or } g_n = \frac{|h_n|^2}{\text{noise} + \Psi} \quad \text{Equation 15}$$

In the exemplary pseudo-code above, the parameter p controls the number of iterations of the binary search. In an exemplary embodiment of the present invention, ten iterations are used. The complexity of the exemplary algorithm is proportional to the number of iterations.

CP-SUR Algorithm

The CP-SUR Algorithm can minimize the number of subcarriers that are used by a single user to satisfy a minimum data rate requirement, subject to minimum total energy, maximum total energy, and maximum energy per carrier constraints. In addition to using the same inputs as the CP-SWF algorithm, the CP-SUR algorithm can receive two additional inputs that indicate the maximum energy per subcarrier $\epsilon_{max\_sc}$ and the flexibility of this requirement (input flex). Exemplary pseudo-code for implementing the CP-SWF algorithm is provided below.

```
1:  Perform lines 1-17 of the CP-SWF Algorithm Above
2:  if ∃ sat_k = true
3:      if ∃ sat_k = true, such that (flex)(ε_{avg_k}) ≤ (ε_{max sc})
4:      then
            The minimum number of required subcarriers is equal
            to the value of k that satisfied condition (3) and whose
            (flex)(ε_{avg_k}) is closest to ε_{max sc}
```

```
 5:    else
 6:        if flex ≠ 1 then
 7:            sat_gen = true
 8:            Then minimum number of required subcarrier is
                equal to the value of k that satisfied condition
                (2) and whose ε_avg_k is closest to ε_max sc
 9:        else
10:            sat_gen = false
11:        end if
12:    end if
13: else
14:    sat_gen = false
15: end if
```

In the exemplary pseudo-code above, the value of $sat_{gen}$ indicates whether the algorithm was able to find a set of subcarriers that satisfied the target data rate, subject to all the constraints. If flex=1, the energy per subcarrier must be strictly less than or equal to $\epsilon_{max\ sc}$. Otherwise, some flexibility is allowed to have an energy per carrier above $\epsilon_{max\ sc}$.

C-MWF Algorithm

The C-MWF algorithm receives, as an input, the reports from each femto-radio 310 regarding the fUEs 110 with the best channel condition $g_n$ (in terms of "channel gain-to-noise ratio") at each subcarrier n and their corresponding minimum target data rate. An exemplary C-MWF algorithm can be summarized in the following steps.

```
 1: Join the reports received from all femto-radios into a single report.
 2: From the single report generated, find the set of fUEs U_1 that globally
    have the best g_n at each subcarrier n among all the femto-radios. Any
    fUE ∉ U_1 is discarded.
 3: Calculate the aggregate minimum data rate R_1 of al fUEs ∈ U_1.
 4: Perform a CP-SWF algorithm, using the best g_n at each subcarrier n,
    from users in U_1, R_1, and total energy ε_1 corresponding to the sum of
    the maximum energy of the femto-radios that serve each of the fUEs ∈
    U_1. Let ε_min_carrier denote the energy per carrier obtained as output from
    the CP-SWF algorithm.
 5: ∀ fUEs ∈ U_1, calculate:
```

$$lev_i = \frac{R_{min_i} - \sum_{n \in N_i} \log_2(g_n)}{|N_i|}$$

Where $N_i$ denotes the set of subcarriers of fUEs in which its channel condition is the best among all fUEs. The value of $lev_i$ is proportional to the water level in a classical water-filling algorithm.

```
 6: Sort the fUEs ∈ U_1 in order of non-decreasing lev.
 7: for j = 1 to |U_1| do
 8:    Select fUE_i with the lowest lev among the fUEs that haven't
       been processed in the loop.
 9:    Perform a CP-SUR algorithm for the selected fUE_i. The
       minimum and maximum total energy correspond to the
       minimum energy of the femto-radio to which fUE_i, while the
       maximum energy per carrier corresponds to ε_min_carrier from step
       6. The value of flex can be 0.7.
10:    if the CP-SUR algorithm returns a successful subcarrier
       assignment
       then
11:        Update the available energy in the femto-radio that
           serves fUE_i.
12:        Free the subcarriers that were not used by fUE_i, due to
           the CP-SUR algorithm.
13:    else
14:        Free the subcarriers that were originally allocated to
           fUE_i.
15:    end if
16:    Reallocate any freed subcarrier among the fUEs ∈ U_1 that
       haven't been processed in the loop, and update their values of
       lev.
17:    Re-sort the users that haven't been processed, in order of non-
       decreasing lev.
18: end for
```

The C-MWF algorithm can calculate the energy per carrier $\epsilon_{min_{carrier}}$ that would be needed in the case that a single user needs to be satisfied with a minimum data rate corresponding to the aggregate data rate of the users that have the best channel condition at each subcarrier. Then, the algorithm sorts users in order of increasing "water level" and minimizes the number of subcarriers that are required by each user to satisfy their individual minimum data rates, using $\epsilon_{min_{carrier}}$ as the maximum energy per carrier (but it is not a strict constraint, as expressed by the value of 0.7 for flex in the exemplary case). Effectively, the algorithm tries to achieve—for the multi-user case—the same result obtained when it is assumed that only a single user (with aggregate data rate) needs to be satisfied. While it is possible that not all fUEs 110 in $U_1$ are satisfied (due to lack of enough subcarriers, energy, or other resources), this algorithm finds a feasible solution for at least a subset of $U_1$. The rest of the fUEs 110 data rate requirements can still be satisfied through the D-MWF algorithm, which is described below.

D-MWF Algorithm

The D-MWF algorithm can receive, as an input, a set of available subcarrier N, a set of fUEs 110 $U_2$ that are served by a specific femto-radio 310, their channel conditions per subcarrier $\epsilon\ U_2$, their minimum data rate requirement, the total minimum and maximum energy for the current femto-radio 310, and a maximum energy per subcarrier (the same for every subcarrier). The objective of the algorithm can be to satisfy as many fUEs 110 as possible, subject to the previous constraints. If $g_i^n$ denotes the "channel gain-to-noise ratio" (taking into account interference of fUE i in subcarrier n from the current femto-radio 310, then an exemplary D-MWF algorithm can be expressed by the following steps:

```
 1: ∀ fUEs ∈ U_2, calculate:
```

$$lev_i = \frac{R_{min_i} - \sum_{n \in N} \log_2(g_i^n)}{|N|}$$

The value of $lev_i$ is proportional to the water level for $fUE_i$ in a classical water-filling algorithm.

```
 2: Sort the fUEs ∈ U_2 in order of non-decreasing lev.
 3: for j = 1 to |U_2| do
 4:    Select fUE_i with the lowest lev among the fUEs that haven't
       been processed in the loop.
 5:    Perform a CP-SUR algorithm for the selected fUE_i, using the
       available subcarriers in N. The minimum and maximum total
       energy correspond to the minimum energy of the femto-radio to
       which fUE_i is associated and energy available in the same
       femto-radio, respectively. The minimum data rate requirement
       is the one for the selected fUE_i, while the maximum energy per
       carrier corresponds to the one established through the inputs.
       The value of flex can be 1, which makes it a strict constraint.
 6:    if the CP-SUR algorithm returns a successful subcarrier
       assignment
       then
 7:        Update the available energy in the femto-radio that
           serves fUE_i.
 8:        Update the available subcarriers in N, by removing from
           N the subcarriers assigned through CP-SUR.
 9:        Update the values of lev for the fUEs ∈ U_2 that haven't
           been processed in the loop.
10:        Re-sort the users that haven't been processed in order of
           non-decreasing lev.
11:    end if
12: end for
```

The D-MWF algorithm can calculate, for each fUE 110 ∈ U$_2$, the "water-level" that would result by using all the available subcarriers. Then, the algorithm can sort the users in order of non-decreasing "water-level" and calculate the minimum number of subcarriers required to satisfy the data requirement, suing the maximum energy per subcarrier (input) constraint. Effectively, the D-MWF algorithm satisfies as many fUEs 110 as possible, subject to the maximum energy per carrier (which is related to the maximum interference that is expected by fUEs 110 in the rest of the femto-radios 310 from the current femto-radio 310).

Joint Relay Resource Management Algorithm

The joint relay resource management algorithm can be in charge of coordinating the joint radio resource management between the femto-radios 310 and the relay radio 305 of a multi-femto-relay system. An exemplary joint relay resource management algorithm can be summarized by the following steps:
1: Indicate to each femto-radio to report the fUEs with the best channel conditions (in terms of "channel gain-to-noise ratio") at each of the available subcarriers.
2: With the reports received, perform a C-MWF algorithm.
3: Assume that each femto-radio uniformly distributes its remaining energy among the subcarriers that were not allocated by C-MWF to each femto-radio (because each femto-radio can be allocated a different set of subcarriers, they can also have a different set of non-allocated subcarriers).
4: Using the subcarrier allocation of the C-MWF algorithm and the expected interference caused by the subcarrier allocation of step 3, adjust the energy of each fUE scheduled by the C-MWF algorithm (by using a CP-SWF algorithm). Report this result back to the femto-radios.
5: Indicate to each femto-radio to perform a D-MWF algorithm with their actual remaining energy, the maximum energy per subcarrier found through step 3, and the fUEs that were not scheduled through the C-MWF algorithm.

Additional steps may be added to the exemplary algorithm above to situations where scheduling in time is desired due to the lack of subcarriers, power, or other resources to satisfy all users simultaneously. Exemplary additional steps for scheduling may include:
1: Indicate to each femto-radio to report back satisfied and unsatisfied fUEs (and their minimum data rates).
2: Prioritize unsatisfied fUEs in the next RRM cycle.
3: Repeat until all fUEs are satisfied. When all the fUEs are satisfied, find the actual data rate achieved by each fUE (by taking into account time delays due to scheduling in time).
4: Modify the minimum data rate for each fUE for the next RRM cycle, to compensate the difference between the actual data rate and the minimum data rate.

As indicated above, the previously discussed algorithms are only exemplary algorithms for implementing the various steps of the methods of allocating resources in a multi-femto-relay system provided by the present invention. Further, while many exemplary embodiments described herein refer to the allocation of subcarriers to various user equipments, it should be understood that the present invention is not limited to the allocation of subcarriers. Instead, embodiments of the present invention can also be used to allocate many other resources of a multi-femto-relay system, including, but not limited to, energy, spread codes, and the like.

Moreover, the various exemplary algorithms and exemplary steps for carrying out those algorithms may be implemented by the JMFRRM 315 and/or the LFRM 325 of a multi-femto-relay system. For example, the JMFRRM 314 and/or the LFRM 325 may comprise instructions for implementing one of more steps of one or more of the algorithms discussed above. The instructions may be stored in one or more memories and implemented on one or more processors.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A femto-relay system, comprising:
a relay-radio in communication with a macro-cell base-station;
a femto-radio in direct communication with the relay-radio and configured to route signals between at least one femto-cell user equipment and a core network via a first communication path comprising a wired IP-backhaul link;
an IP-backhaul QoS monitoring module continuously monitoring a quality of service delivered by the wired IP-backhaul link for current communications between the at least one femto-cell user equipment and the core network and to notify the relay-radio to route signals between the at least one femto-cell user equipment and the core network via a second communication path comprising the macro-cell base-station when the quality of service is below a predetermined threshold, and
a femto-relay resource management module comprising a processor and a memory containing instructions that, when executed by the processor, cause the processor to:
create a list of a plurality of femto-cell user equipments;
select a resource block for a particular femto-cell user equipment selected from the list of the plurality of femto-cell user equipments;
prevent non-selected femto-cell user equipments from the plurality of femto-cell user equipments from using the resource block;
calculate a maximum data rate for the particular femto-cell user equipment; and
assign a minimum necessary power for the resource block to provide an amount of resources needed by the particular femto-cell user equipment.

2. The femto-relay system of claim 1, wherein the relay-radio is configured to route signals to and from at least one macro-cell user equipment via the macro-cell base-station.

3. The femto-relay system of claim 1, wherein the relay-radio is capable of communication with the macro-cell base-station via a communication path that is an indirect link comprising at least one repeater unit.

4. The femto-relay system of claim 3, wherein the at least one repeater unit is a femto-relay system.

5. The femto-relay system of claim 1, wherein the femto-radio is further configured to route signals to and from at least one macro-cell user equipment via the relay-radio and the macro-cell base-station.

6. In a femto-relay system having a limited amount of resources, the resources comprising a limited number of subcarriers and transmission energy, to serve a plurality of femto-cell user equipments, a method of allocating the limited resources to the user equipments, the method comprising:
    calculating a channel gain between the femto-cell user equipment and femto-relay system for each femto-cell user equipment at each subcarrier in the limited number of subcarriers;
    identifying a first group of femto-cell user equipment experiencing a highest channel gain at each available subcarrier in the limited number of subcarriers;
    allocating to the first group of femto-cell user equipments a first portion of the limited number of subcarriers at which the first group of femto-cell user equipments experienced the highest channel gain, and transmission energy that minimizes the total transmission energy and satisfies minimum data rate requirements of the first group of femto-cell user equipments;
    allocating remaining transmission energy approximately uniformly among the subcarriers in the limited number of subcarriers not assigned to the first group of femto-cell user equipments; and
    increasing the transmission energy assigned to the first group of femto-cell user to account for interference until a minimum data rate requirement is met for each femto-cell user equipment in the first group of femto-cell user equipments.

7. The method of claim 6, further comprising:
    reperforming the allocating a first amount of resources and allocating remaining transmission energy when a femto-cell user equipment previously being served by the femto-relay system is no longer being served by the femto-relay system.

8. The method of claim 6, further comprising determining whether there are enough resources in the limited amount of resources to assign a sufficient amount of resources to each user equipment in the plurality of femto-cell user equipments such that a minimum data rate requirement of each femto-cell user equipment is satisfied.

9. In a femto-relay system having a limited amount of resources to serve a first number of macro-cell and/or femto-cell user equipments, each user equipment needing an individual amount of resources to satisfy a quality of service for the respective user equipment, a method of allocating the limited resources to the user equipments, the method comprising:
    creating a list of a plurality of femto-cell user equipments;
    selecting a resource block for a particular femto-cell user equipment selected from the list of the plurality of femto-cell user equipments;
    preventing non-selected femto-cell user equipments from the plurality of femto-cell user equipments from using the resource block;
    calculating a maximum data rate for the particular femto-cell user equipment;
    assigning a minimum necessary power for the resource block to provide an amount of resources needed by the particular femto-cell user equipment; and
    performing a first resource allocation sub-method when the limited amount of resources is greater than or equal to the individual amount of resources of each user equipment in the first number of macro-cell and/or femto-cell user equipments added together, the first resource allocation sub-method comprising:
        allocating the individual amount of resources needed by each user equipment in the first number of macro-cell and/or femto-cell user equipments to each respective user equipment, wherein the individual amount of resources needed by each user equipment in the first number of macro-cell and/or femto-cell user equipments comprises at least one of OFDMA subcarriers, CDMA spreading codes, and transmission energy;
    performing a second resource allocation sub-method when the limited amount of resources is less than the individual amount of resources for each user equipment in the first number of macro-cell and/or femto-cell user equipments added together, the second resource allocation sub-method comprising:
        allocating the individual amount of resources needed by each femto-cell user equipment in the first number of macro-cell and/or femto-cell user equipments to each respective femto-cell user equipment, wherein the individual amount of resources needed by each femto-cell user equipment in the first number of macro-cell and/or femto-cell user equipments comprises at least one of OFOMA subcarriers, COMA spreading codes, and transmission energy; and
        using the remaining amount of resources not allocated to femto-cell user equipments to allocate the individual amount of resources of one or more macro-cell user equipments in the first amount of macro-cell and/or femto-cell user equipments to the respective one or more macro-cell user equipments, wherein the individual amount of resources needed of one or more macro-cell user equipments in the first amount of macro-cell and/or femto-cell user equipments comprises at least one of OFDMA subcarriers, CDMA spreading codes, and transmission energy.

10. The method of claim 9, further comprising:
    reperforming the first resource allocation sub-method when a macro-cell or femto-cell user equipment previously being served by the femto-relay system is no longer being served by the femto-relay system, and the limited amount of resources is greater than or equal to the individual amount of resources for each user equipment currently being served by the femto-relay system added together;
    reperforming the second resource allocation sub-method when a macro-cell or femto-cell user equipments previously being served by the femto-relay system is no longer being served by the femto-relay system and the limited amount of resources is less than the individual amount of resources for each user equipment currently being served by the femto-relay system added together; and
    reperforming the second resource allocation sub-method when all macro-cell and/or femto-cell user equipments previously being served by the femto-relay system are still being served by the femto-relay system.

11. A multi-femto-relay system, comprising:
a relay-radio in communication with a macro-cell base-station;
a plurality of femto-radios, each femto-radio in direct communication with the relay-radio and configured to route signals to and from at least one femto-cell user equipment via a first communication path comprising a wired IP-backhaul link;
wherein the relay-radio comprises a joint multi-femto-relay resource management module comprising a processor and a memory containing instructions that, when executed by the processor, cause the processor to:
receive a report from each femto-radio containing an identity of femto-cell user equipments with the best channel conditions at each of a plurality of available subcarriers;
perform a centralized multi-user and multi-femto-radio energy minimization water-filling algorithm based on the reports from the femto-radios;
adjust the energy of each femto-user equipment scheduled by the centralized multi-user and multi-femto-radio energy minimization water-filling algorithm, assuming that each femto-radio uniformly distributes its remaining energy among the subcarriers that were not allocated by the centralized multi-user and multi-femto-radio energy minimization water-filling algorithm at each femto-radio;
perform a distributed multi-user energy minimization water filling algorithm at each femto-radio with the femto-cell user equipments that were not scheduled through the centralized multi-user energy minimization water-filling algorithm.

12. The multi-femto-relay system of claim 11, wherein the relay-radio is configured to route signals to and from at least one macro-cell user equipment via the macro-cell base-station.

13. The multi-femto-relay system of claim 11, wherein each femto, radio further comprises a local femto resource management module managing resources assigned to the femto-radio to reduce interference between the femto-cell user equipments in communication with the femto-radio.

14. The multi-femto-relay system of claim 11, wherein the relay-radio is in communication with the macro-cell base-station via a communication path that is one of a direct link or an indirect link, wherein the indirect link comprises at least one repeater unit.

15. The multi-femto-relay system of claim 11, wherein each femto-radio is in communication with the relay-radio via a communication path that is one of a direct link or an indirect link, wherein the indirect link comprises at least one repeater unit.

16. The multi-femto-relay system of claim 15, wherein the at least one repeater unit is a second femto-radio.

17. The multi-femto-relay system of claim 11, wherein at least one femto-radio in the plurality of femto-radios is further configured to route signals between a core network and a macro-cell user equipment through the relay-radio and the macro-cell base-station.

* * * * *